US011172335B2

United States Patent
Ma

(10) Patent No.: US 11,172,335 B2
(45) Date of Patent: Nov. 9, 2021

(54) POSITIONING OPERATION METHOD, APPARATUS, AND SYSTEM

(71) Applicant: HUAWEI TECHNOLOGIES CO., LTD., Guangdong (CN)

(72) Inventor: Jingwang Ma, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/993,865

(22) Filed: Aug. 14, 2020

(65) Prior Publication Data
US 2020/0374661 A1   Nov. 26, 2020

Related U.S. Application Data

(63) Continuation of application No. PCT/CN2019/075075, filed on Feb. 14, 2019.

(30) Foreign Application Priority Data
Feb. 14, 2018   (CN) .................. 201810152314.1

(51) Int. Cl.
H04W 4/029   (2018.01)
H04W 4/20    (2018.01)

(52) U.S. Cl.
CPC ............ *H04W 4/029* (2018.02); *H04W 4/20* (2013.01)

(58) Field of Classification Search
CPC ....... H04W 4/029; H04W 4/20; H04W 64/00; H04W 4/02; H04W 4/025
See application file for complete search history.

(56) References Cited

U.S. PATENT DOCUMENTS 8,614,987 B2 * 12/2013 Hapsari .................. H04W 8/20
                                                  370/331
9,380,409 B2 *  6/2016 Morisaki ............... H04W 4/029
(Continued)

FOREIGN PATENT DOCUMENTS

CN    102413419 A    4/2012
CN    103415015 A    11/2013

OTHER PUBLICATIONS

3GPP TS 23.271 V143.0 (Dec. 2017), "3rd Generation Partnership Project;Technical Specification Group Services and System Aspects;Functional stage 2 description of Location Services (LCS)(Release 14)," Dec. 2017, 183 pages.
(Continued)

*Primary Examiner* — Kabir A Timory
(74) *Attorney, Agent, or Firm* — Fish & Richardson P.C.

(57) ABSTRACT

Embodiments of this application provide a positioning operation method, apparatus, and system. A location management function entity receives a first message sent by a network exposure function entity, where the first message carries first positioning operation information, the first message is sent by a network exposure function entity based on a request of a third-party device, and the first positioning operation information is used to request the location management function entity to perform a first positioning operation on a terminal. The location management function entity may determine positioning configuration information of the terminal; further determine, based on the positioning configuration information of the terminal, whether the first positioning operation is allowed on the terminal; and send a third message to the network exposure function entity based on a determining result.

20 Claims, 11 Drawing Sheets

(56) References Cited

U.S. PATENT DOCUMENTS 9,781,259 B1 10/2017 Kodaypak
2017/0311304 A1 10/2017 Lu

OTHER PUBLICATIONS

3GPP TS 23.501 V15.0.0 (Dec. 2017),"3rd Generation Partnership Project;Technical Specification Group Services and System Aspects; System Architecture for the 5G System; Stage 2 (Release 15)," Dec. 2017, 181 pages.
3GPP TR 23.871 v.2.1.0 (2002), "3rd Generation Partnership Project;Technical Specification Group Services and System Aspects; System Aspects;Technical Report Enhanced support for User Privacy in location services (Release 5)," 2002, 34 pages.
Editor, "Cover page for TR 23.871 v.2.1.0," 3GPP TSG-SA #16, SP-020379, Marco Island, Florida, USA, Jun. 10-14, 2002, 2 pages.
EPO Communication pursuant to Rule 154(1) EPC Partial Supplementary European Search Report issued in European Application No. 19754632.8 dated Oct. 28, 2020, 15 pages.
Ericsson, MONTE: Monitor Location using GMLC. SA WG2 Meeting #106, S2-144451, San Francisco, USA, Nov. 17-21, 2014, 3 pages.
Office Action issued in Chinese Application No. 201810152314.1 dated Dec. 20, 2019, 13 pages (with English translation).
Qualcomm Incorporated et al., "5G System Procedures for Location Support of Emergency Services," SA WG2 Meeting #123, S2-177256, Ljubljana, Slovenia, Oct. 23-27, 2017, 21 pages.
Qualcomm Incorporated et al., "Discussion Paper on 5GC Location Solutions," SA WG2 Meeting #123, S2-177258, Ljubljana, Slovenia, Oct. 23-27, 2017, 10 pages.

* cited by examiner

POSITIONING OPERATION METHOD, APPARATUS, AND SYSTEM

CROSS-REFERENCE TO RELATED APPLICATIONS

This application is a continuation of international Application No. PCT/CN2019/075075, filed on Feb. 14, 2019, which claims priority to Chinese Patent Application No. 201810152314.1, filed on Feb. 14, 2018. The disclosures of the aforementioned applications are hereby incorporated by reference in their entireties.

TECHNICAL FIELD

This application relates to the field of communications technologies, and in particular, to a positioning operation method, apparatus, and system.

BACKGROUND

With continuous expansion of business modes, a current mobile communications network needs to notify a third-party device of location information of a terminal in some scenarios. For example, to determine a location of a courier, location information of a terminal of the courier needs to be sent to a third-party device of an express company through a network side device, to monitor and manage a working status of the courier in real time.

In a 5G network architecture, it has been currently determined that a network exposure function entity (NEF) serves as an interface node for providing a service for a third-party device in a mobile communications network, but currently, a terminal positioning operation service cannot be provided for the third-party device through the NEF.

In conclusion, currently, a terminal positioning operation service cannot be provided for a third-party device through a network exposure function entity.

SUMMARY

This application provides a positioning operation method, apparatus, and system, to resolve a problem that currently, a terminal positioning operation service cannot be provided for a third-party device through a network exposure function entity.

According to a first aspect, an embodiment of this application provides a positioning operation method. A location management function entity receives a first message sent by a network exposure function entity, where the first message is sent by the network exposure function entity after the network exposure function entity receives an identifier of a terminal and first positioning operation information that are sent by a third-party device, where the first message carries the first positioning operation information, and the first positioning operation information is used to request the location management function entity to perform a first positioning operation on the terminal. The location management function entity may determine positioning configuration information of the terminal; further determine, based on the positioning configuration information of the terminal, whether the first positioning operation is allowed on the terminal; and send a third message to the network exposure function entity based on a determining result. Then the network exposure function entity sends a second message to the third-party device based on the third message. According to the foregoing positioning operation method, the network exposure function entity can request the location management function entity to perform the first positioning operation, to provide a terminal positioning operation service for the third-party device through the network exposure function entity.

In a possible design, the first positioning operation information may be some or all of a type identifier and/or a parameter of a positioning operation that needs to be performed, a type identifier and/or a parameter of a positioning operation that needs to be stopped, and a type identifier and/or a parameter of a positioning operation that needs to be modified, so that the location management function entity can perform some or all of the following operations based on the request of the network exposure function entity: performing a positioning operation on the terminal, stopping a positioning operation on the terminal, and modifying a type and a parameter of a positioning operation performed on the terminal.

In a possible design, the first message further carries the identifier of the terminal, and the location management function entity may determine the positioning configuration information of the terminal based on the identifier of the terminal. Optionally, a method for determining the positioning configuration information of the terminal by the location management function entity may be: sending the identifier of the terminal to a unified data management platform, and receiving the positioning configuration information of the terminal from the unified data management platform; or may be: locally obtaining the positioning configuration information of the terminal from the location management function entity based on the identifier of the terminal.

In a possible design, if the location management function entity determines that the first positioning operation is allowed to be performed, the location management function entity may send, to the network exposure function entity, a third message carrying accept information and/or generated positioning information; otherwise, the location management function entity may send, to the network exposure function entity, a third message carrying reject information, so that the network exposure function entity can send a different second message to the third-party device based on content of the third message.

In a possible design, the location management function entity determines, based on positioning status information included in the positioning configuration information, whether the first positioning operation is allowed on the terminal, where the positioning status information is used to indicate a positioning operation allowed by the terminal and/or a positioning operation rejected by the terminal.

In a possible design, the positioning configuration information may be sent by the terminal to the location management function entity that provides a location service for the terminal, and after receiving the positioning configuration information sent by the terminal, the location management function entity may locally store the positioning configuration information, to quickly obtain the positioning configuration information when the location service is performed for the terminal; and/or, the location management function entity may send the positioning configuration information to a unified data management platform, and the unified data management platform may store the positioning configuration information of the terminal, so that the location management function entity obtains the positioning configuration information of the terminal through the unified data management platform. After the positioning configuration information changes, the terminal may send, through an access and mobility management function entity, changed positioning configuration information to the location management function entity. The terminal may alternatively carry the positioning configuration information when initiating a registration request to an access and mobility management function entity, and send the positioning configuration information to the location management function entity through the access and mobility management function entity.

In a possible design, the location management function entity may further determine second positioning operation information after determining that the first positioning operation is allowed on the terminal, and send fourth information to the network exposure function entity and/or a unified data management platform, where the fourth information carries the second positioning operation information, and the second positioning operation information includes a positioning operation that is allowed on the terminal. Specifically, the second positioning operation information may include some or all of a type identifier and/or a parameter of a performed positioning operation, a type identifier and/or a parameter of a stopped positioning operation, and a type identifier and/or a parameter of a modified positioning operation. The second positioning operation information may be the same as the first positioning operation information; or a type of a second positioning operation indicated by the second positioning operation information may be the same as a type of the first positioning operation indicated by the first positioning operation information, and a parameter of the second positioning operation indicated by the second positioning operation information may be different from a parameter of the first positioning operation indicated by the first positioning operation information.

In a possible design, before receiving the first message, the location management function entity may determine to provide a location service for the terminal, and send the identifier of the terminal and information about the location management function entity to a unified data management platform, for the unified data management platform to obtain the information about the location management function entity that provides the location service for the terminal, so that after receiving the identifier of the terminal that is sent by the network exposure function entity, the unified data management platform can determine, based on the foregoing information, the information about the location management function entity that provides a service for the terminal. After receiving the fourth message sent by the access and mobility management function entity, the location management function entity may determine to provide the location service for the terminal, where the fourth message is sent by the access and mobility management function entity after the access and mobility management function entity receives a registration request of the terminal.

According to a second aspect, an embodiment of this application further provides a location management function entity for a positioning operation. The location management function entity may include a transceiver, a memory, and a processor. The transceiver is used for communication by the location management function entity. The memory is configured to store code. The processor is configured to execute the code stored in the memory, to perform the positioning operation method according to any one of the first aspect and the possible designs of the first aspect.

According to a third aspect, an embodiment of this application further provides a unified data management platform for a positioning operation. The unified data management platform may include a transceiver, a memory, and a processor. The transceiver is used for communication by the unified data management platform. The memory is configured to store code. The processor is configured to execute the code stored in the memory, to perform the positioning operation method according to any one of the first aspect and the possible designs of the first aspect.

According to a fourth aspect, an embodiment of this application further provides a terminal for a positioning operation. The terminal may include a transceiver, a memory, and a processor. The transceiver is used for communication by the terminal. The memory is configured to store code. The processor is configured to execute the code stored in the memory, to perform the positioning operation method according to any one of the first aspect and the possible designs of the first aspect.

According to a fifth aspect, an embodiment of this application further provides a network exposure function entity for a positioning operation. The network exposure function entity may include a transceiver, a memory, and a processor. The transceiver is used for communication by the network exposure function entity. The memory is configured to store code. The processor is configured to execute the code stored in the memory, to perform the positioning operation method according to any one of the first aspect and the possible designs of the first aspect.

According to a sixth aspect, an embodiment of this application further provides a readable storage medium. The readable storage medium stores a program or an instruction. When the program or the instruction is run on a computer, the positioning operation method according to any one of the first aspect and the possible designs of the first aspect is performed.

According to a seventh aspect, an embodiment of this application further provides a computer program product. When the computer program product is invoked and executed by a computer, the computer may be enabled to complete the method related to the location management function entity, the unified data management platform, the terminal, or the network exposure function entity according to any one of the first aspect and the possible designs of the first aspect According to an eighth aspect, this application further provides a chip. The chip may be coupled to the transceiver according to the second aspect, the third aspect, the fourth aspect, or the fifth aspect, and is configured to implement the positioning operation method that can be implemented according to the second aspect, the third aspect, the fourth aspect, or the fifth aspect.

According to a ninth aspect, an embodiment of this application further provides a positioning operation system. The system includes the location management function entity according to the second aspect.

In some possible implementations, the system may further include the unified data management platform according to the third aspect.

In some possible implementations, the system may further include the terminal according to the fourth aspect.

In some possible implementations, the system may further include the network exposure function entity according to the fifth aspect.

In some possible implementations, the system may further include another device, for example, an access and mobility management function entity, that interacts with the location management function entity according to the second aspect in the solutions provided in the embodiments of this application.

DESCRIPTION OF EMBODIMENTS

Embodiments of this application provide a positioning operation method, apparatus, and system. According to the method, a location management function entity receives a first message sent by a network exposure function entity, where the first message carries first positioning operation information, and the first positioning operation information is used to request the location management function entity to perform a first positioning operation on a terminal; the location management function entity may determine positioning configuration information of the terminal, and further determine, based on the positioning configuration information of the terminal, whether the first positioning operation is allowed on the terminal; and the location management function entity may further send a third message to the network exposure function entity based on a determining result. According to the foregoing positioning operation method, the network exposure function entity can send the first message to the location management function entity, so that the location management function entity performs the first positioning operation on the terminal based on the first positioning operation information in the first message.

To make the objectives, technical solutions, and advantages of this application clearer, the following further describes this application in detail with reference to the accompanying drawings. In the description of this application, unless otherwise stated, "a plurality" means two or more than two. In addition, it should be understood that, in the description of the embodiments of this application, terms such as "first" and "second" are merely used for distinction and description, and shall not be understood as an indication or implication of relative importance or an indication or implication of an order.

It should be noted that, the positioning operation method provided in this application may be performed by an apparatus, or the positioning operation method may be performed by a system including a connection relationship between apparatuses.

Figure 1:
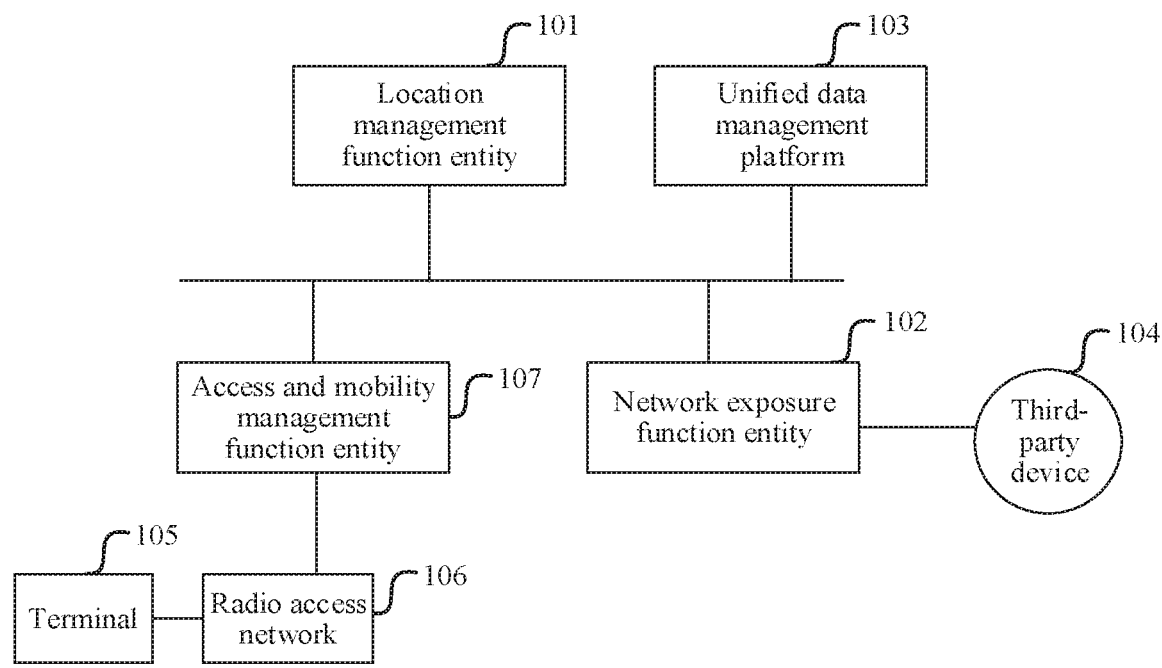
FIG. 1 is a schematic structural diagram of a positioning operation system according to an embodiment of this application.

As shown in FIG. 1, a positioning operation system provided in an embodiment of this application includes a location management function entity 101, a network exposure function entity 102, a unified data management platform 103, and a third-party device 104.

It should be understood that, the location management function entity in this embodiment of this application is a function entity that is in a core network and that is configured to perform location management on UE, and a function supported by the location management function entity includes one or more of the following: checking and authorizing a positioning request for a terminal, managing privacy of terminal location, and charging for a location service for the terminal. Specifically, a location management function entity in a 5th generation (5G) wireless communications system may be an LMF (LMF) network element. The LMF may determine location information of UE based on a request of a core network entity (for example, an access and mobility management function entity (AMF)), and provide the location information of the UE to the corresponding core network entity (for example, the AMF) that requests to position the UE, to provide a location service (LCS). During implementation, the AMF may allocate at least one LMF to the UE, to provide the location service for the UE. When the UE needs to obtain location information, the UE may request the location information from the LMF through the AMF. The location management function entity in the 5th generation (5G) wireless communications system may alternatively be a gateway mobile location center (GMLC) or have another name. This is not limited in this application. In future communications (for example, in a 6G or another network), the location management function entity may still be an LMF network element, or have another name. This is not limited in this application.

An example in which the location management function entity 101 is an LMF network element is used below to describe a possible structure of the location management function entity provided in this embodiment of this application.

Figure 2:
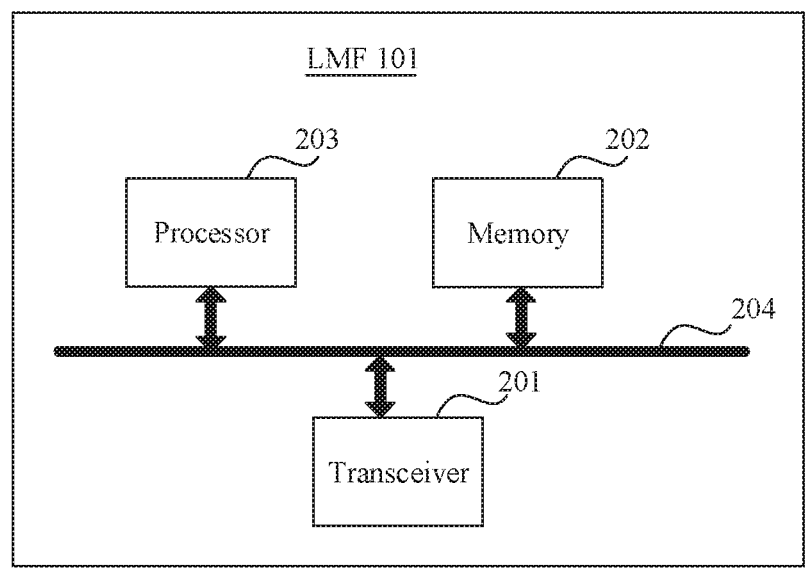
FIG. 2 is a schematic structural diagram of a location management function entity for a positioning operation according to an embodiment of this application.

During implementation, the LMF 101 for a positioning operation provided in this embodiment of this application may have a structure shown in FIG. 2. The LMF 101 includes a transceiver 201, a memory 202, and a processor 203. The transceiver 201 may be used for communication by the LMF 101. The memory 202 stores a computer program. The processor 203 is configured to execute the computer program stored in the memory 202, so that the LMF 101 implements the positioning operation method provided in the embodiment of this application. It should be noted that, a specific connection medium between the processor 203, the memory 202, and the transceiver 201 is not limited in this embodiment of this application. In this embodiment of this application, in FIG. 2, an example in which the processor 203, the memory 202, and the transceiver 201 are connected to each other by using a bus 204 is used. The bus 204 is represented by using a bold line in FIG. 2, and a connection manner between other components is merely described by using an example, and is not limited thereto. The bus 204 may be classified into an address bus, a data bus, a control bus, and the like. For ease of representation, only one bold line is used to represent the bus in FIG. 2, but this does not mean that there is only one bus or only one type of bus.

The network exposure function entity in this embodiment of this application is a function entity that is in the core network and that is configured to provide an interface for a third-party device other than a network side device and UE. A network capability can be externally exposed through the network exposure function entity. Specifically, the network exposure function entity may be an NEF in a 5G communications system. The NEF can receive a service request of the third-party device, or the NEF sends, to the third-party device, a response message and/or service data corresponding to the service request. In future communications (for example, in a 6G or another network), network exposure function entity may still be an NEF network element, or have another name. This is not limited in this application.

An example in which the network exposure function entity 102 is an NEF network element is used below to describe a possible structure of the network exposure function entity provided in this embodiment of this application.

Figure 3:
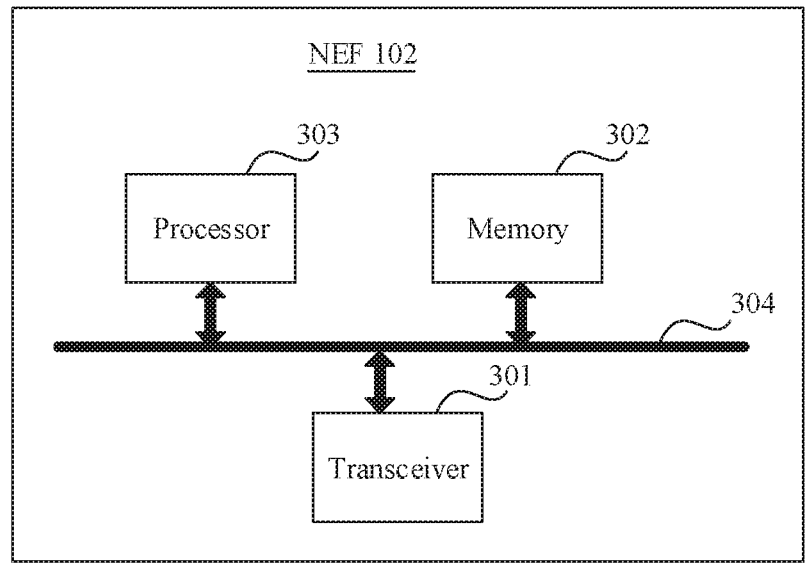
FIG. 3 is a schematic structural diagram of a network exposure function entity for a positioning operation according to an embodiment of this application.

During implementation, the NEF 102 for a positioning operation provided in this embodiment of this application may have a structure shown in FIG. 3. The NEF 102 includes a transceiver 301, a memory 302, and a processor 303. The transceiver 301 may be used for communication by the NEF 102. The memory 302 stores a computer program. The processor 303 is configured to execute the computer program stored in the memory 302, so that the NEF 102 implements the positioning operation method provided in the embodiments of this application. It should be noted that, a specific connection medium between the processor 303, the memory 302, and the transceiver 301 is not limited in this embodiment of this application. In this embodiment of this application, in FIG. 3, an example in which the processor 303, the memory 302, and the transceiver 301 are connected to each other by using a bus 304 is used. The bus 304 is represented by using a bold line in FIG. 3, and a connection manner between other components is merely described by using an example, and is not limited thereto. The bus 304 may be classified into an address bus, a data bus, a control bus, and the like. For ease of representation, only one bold line is used to represent the bus in FIG. 3, but this does not mean that there is only one bus or only one type of bus.

The unified data management platform in this embodiment of this application is a unified device for data storage and management in the core network. Specifically, the unified data management platform may be a UDM (unified data management) network element. In a location service for UE, the UDM may store positioning configuration information of the UE. The positioning configuration information may include content such as information indicating whether the UE enables the location service and/or information about a positioning operation that is allowed on the UE. During implementation, the information indicating whether the UE enables the location service may be represented as location service exposure setting information, and the information about the positioning operation that is allowed on the UE may be represented as content such as subscription data and privacy protection setting information of the location service. In future communications (for example, in a 6G or another network), the unified data management platform may still be a UDM network element, or have another name. This is not limited in this application.

An example in which the unified data management platform 103 is a UDM network element is used below to describe a possible structure of the unified data management platform provided in this embodiment of this application.

Figure 4:
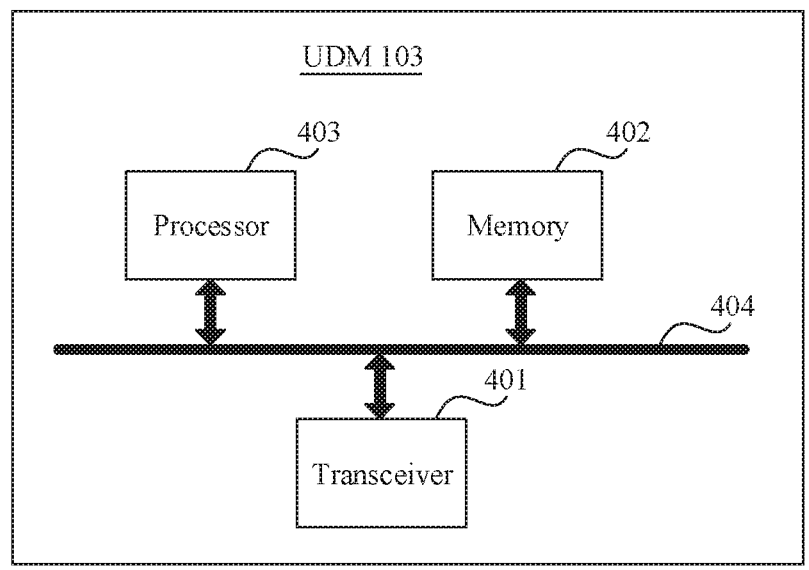
FIG. 4 is a schematic structural diagram of a unified data management platform for a positioning operation according to an embodiment of this application.

During implementation, the UDM 103 for a positioning operation provided in this embodiment of this application may have a structure shown in FIG. 4. The UDM 103 includes a transceiver 401, a memory 402, and a processor 403. The transceiver 401 may be used for communication by the UDM 103. The memory 402 stores a computer program. The processor 403 is configured to execute the computer program stored in the memory 402, so that the UDM 103 implements the positioning operation method provided in the embodiments of this application. It should be noted that, a specific connection medium between the transceiver 401, the memory 402, and the processor 403 is not limited in this embodiment of this application. In this embodiment of this application, in FIG. 4, an example in which the transceiver 401, the memory 402, and the processor 403 are connected to each other by using a bus 404 is used. The bus 404 is represented by using a bold line in FIG. 4, and a connection manner between other components is merely described by using an example, and is not limited thereto. The bus 404 may be classified into an address bus, a data bus, a control bus, and the like. For ease of representation, only one bold line is used to represent the bus in FIG. 4, but this does not mean that there is only one bus or only one type of bus.

The third-party device in this embodiment of this application is a device that requests, through the NEF, core network capability exposure, and the third-party device is a device other than a network side device and UE. Specifically, the third-party device is connected to the NEF through an application interface provided by the NEF, and the NEF requests a core network device to provide a network service required by the third-party device.

It should be understood that, the third-party device in this embodiment of this application may be a terminal device or a server device. The terminal device may be a device that provides a user with voice and/or data connectivity, a handheld device having a wireless connection function, or another processing device connected to a wireless modem. The terminal device may alternatively be a wireless terminal. The wireless terminal may communicate with one or more core networks by using a radio access network (RAN) or a next generation radio access network (NG-RAN). The wireless terminal may be a mobile terminal, for example, a mobile phone (or referred to as a "cellular" phone) or a computer with a mobile terminal, for example, the computer with a mobile terminal may be a portable, pocket-sized, handheld, computer built-in, or vehicle mounted mobile apparatus that exchanges languages and/or data with the radio access network. A specific type of the mobile terminal is not limited in this embodiment of this application. The server device may be a computer device that has a fixed internet protocol (IP) address and that is configured to provide a service for a network user.

Figure 5:
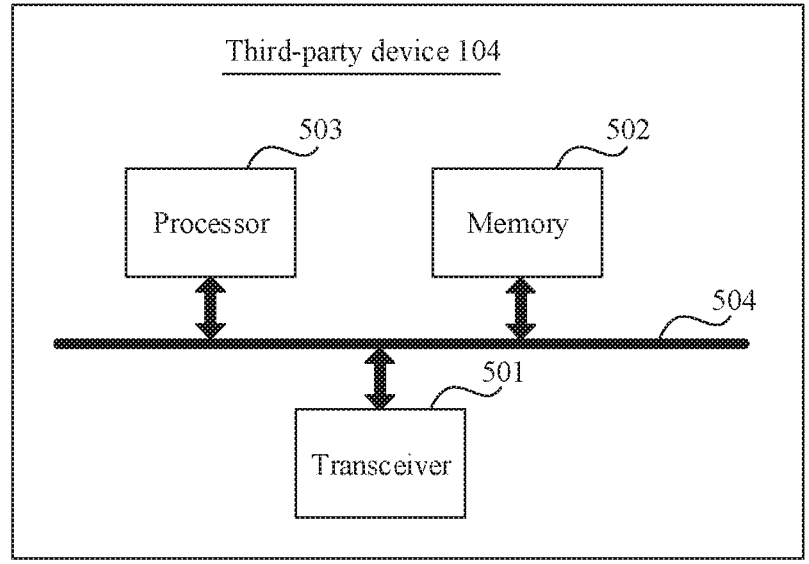
FIG. 5 is a schematic structural diagram of a third-party device for a positioning operation according to an embodiment of this application.

During implementation, the third-party device 104 for a positioning operation provided in this embodiment of this application may have a structure shown in FIG. 5. The third-party device 104 includes a transceiver 501, a memory 502, and a processor 503. The transceiver 501 may be used for communication by the third-party device 104. The memory 502 stores a computer program. The processor 503 is configured to execute the computer program stored in the memory 502, so that the third-party device 104 implements the positioning operation method provided in the embodiments of this application. It should be noted that, a specific connection medium between the processor 503, the memory 502, and the transceiver 501 is not limited in this embodiment of this application. In this embodiment of this application, in FIG. 5, an example in which the processor 503, the memory 502, and the transceiver 501 are connected to each other by using a bus 504 is used. The bus 504 is represented by using a bold line in FIG. 5, and a connection manner between other components is merely described by using an example, and is not limited thereto. The bus 504 may be classified into an address bus, a data bus, a control bus, and the like. For ease of representation, only one bold line is used to represent the bus in FIG. 5, but this does not mean that there is only one bus or only one type of bus.

In addition, during implementation, the positioning operation system provided in this embodiment of this application may further include a terminal 105, a radio access network 106, and an access and mobility management function entity 107. The terminal 105 is connected to the access and mobility management function entity 107 through the radio access network 106. In this embodiment of this application, the terminal 105 may be a terminal on which the third-party device 104 requests to perform a first positioning operation. To be specific, the third-party device 104 requests, through the positioning operation system provided in this embodiment of this application, to perform the first positioning operation on the terminal 105.

During implementation, the terminal 105 may be a device having a wireless communication function, and may be deployed on land, including an indoor, outdoor, handheld, wearable, or vehicle-mounted device; or may be deployed on a water surface (for example, on a steamboat); or may be deployed in the air (for example, on a plane, a balloon, or a satellite). The terminal may be a mobile phone, a tablet computer (pad), a computer having a wireless receiving and sending function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like; or may be user equipments (UE), mobile stations (MS), or terminal devices in various forms.

An example in which the terminal 105 is UE is used below to describe a possible structure of the unified data management platform provided in this embodiment of this application.

Figure 6:
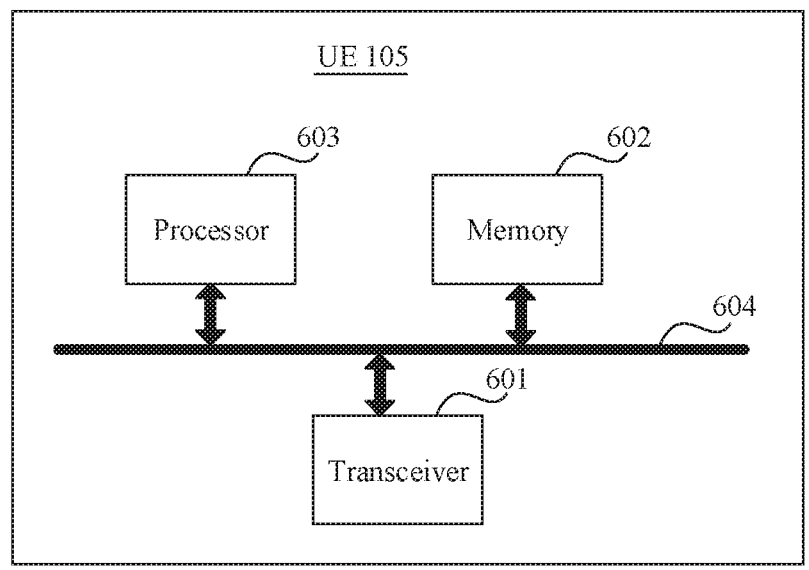
FIG. 6 is a schematic structural diagram of a terminal for a positioning operation according to an embodiment of this application.

During implementation, the UE 105 for a positioning operation provided in this embodiment of this application may have a structure shown in FIG. 6. The UE 105 includes a transceiver 601, a memory 602, and a processor 603. The transceiver 601 may be used for communication by the UE 105. The memory 602 stores a computer program. The processor 603 is configured to execute the computer program stored in the memory 602, so that the UE 105 implements the positioning operation method provided in the embodiments of this application. It should be noted that, a specific connection medium between the processor 603, the memory 602, and the transceiver 601 is not limited in this embodiment of this application. In this embodiment of this application, in FIG. 6, an example in which the processor 603, the memory 602, and the transceiver 601 are connected to each other by using a bus 604 is used. The bus 604 is represented by using a bold line in FIG. 6, and a connection manner between other components is merely described by using an example, and is not limited thereto. The bus 604 may be classified into an address bus, a data bus, a control bus, and the like. For ease of representation, only one bold line is used to represent the bus in FIG. 6, but this does not mean that there is only one bus or only one type of bus.

The access and mobility management function entity in this embodiment of this application is a core network entity that is in the core network and that provides a service for the terminal 105. Specifically, the access and mobility management function entity may be an AMF network element in a 5G communications system. As shown in FIG. 1, the AMF 107 may receive a registration request that is sent by the UE 105 in a registration process, and after the UE 105 is registered, the AMF 107 may provide a service for the UE 105. In future communications (for example, in a 6G or another network), the access and mobility management function entity may still be an AMF network element, or have another name. This is not limited in this application.

The radio access network in this embodiment of this application may be an NG-RAN. In future communications (for example, in a 6G or another network), the radio access network may still be an NG-RAN network element, or have another name. This is not limited in this application.

The foregoing network elements and/or entities may be network elements or devices in a hardware device, or may be software functions run on dedicated hardware, or may be instantiated virtualization functions on a platform (for example, a cloud platform).

The positioning operation system shown in FIG. 1 is used as an example below to describe the positioning operation method provided in the embodiments of this application. The location management function entity 101 is an LMF network element, the network exposure function entity 102 is an NEF network element, the unified data management platform 103 is a UDM network element, the terminal 105 is UE, the radio access network 106 is an NG-RAN, and the access and mobility management function entity is an AMF.

Figure 7:
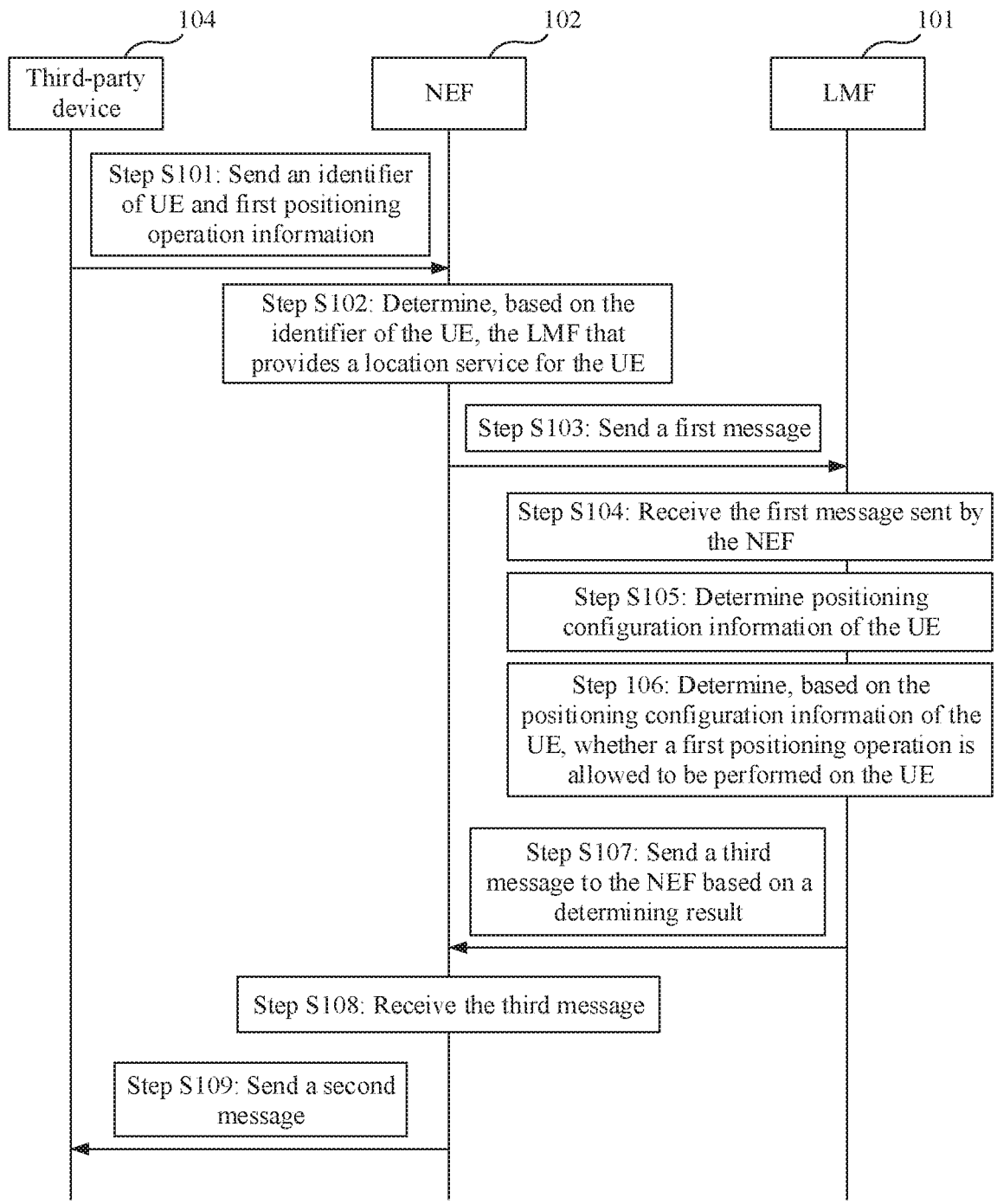
FIG. 7 is a schematic flowchart (1) of a positioning operation method according to an embodiment of this application.

As shown in FIG. 7, a positioning operation method provided in an embodiment of this application includes the following steps.

Step S101: An NEF 102 receives an identifier (ID) of UE 105 and first positioning operation information that are sent by a third-party device 104, where the first positioning operation information is used to request an LMF to perform a first positioning operation on the UE 105. Optionally, the identifier of the UE 105 may be a public UE identifier of the UE, the first positioning operation may be some or all of a type identifier and/or a parameter of a positioning operation that needs to be performed, a type identifier and/or a parameter of a positioning operation that needs to be stopped, or a type identifier and/or a parameter of a positioning operation that needs to be modified. For example, a type of a positioning operation may be positioning the UE at a preset interval, and a parameter of the positioning operation may be information indicating that the preset interval is 5 minutes. Optionally, the first positioning operation may further include information about the third-party device 104, for example, an identifier of the third-party device or an identifier of an App (application) in the third-party device 104. The third-party device 104 sends, as triggered by the App, the identifier of the UE 105 and the first positioning operation information to the NEF 102.

Step S102: The NEF 102 determines, based on the identifier of the UE 105, an LMF 101 that provides a location service for the UE 105.

Step S103: The NEF 102 sends a first message to the LMF 101, where the first message includes the first positioning operation information. Optionally, the first message may further include the identifier of the UE 105, the identifier of the UE 105 is an SUPI, the SUPI of the UE 105 may be determined by the NEF 102 based on the public UE identifier of the UE 105, and the first positioning operation information may be sent by the third-party device 104 to the NEF 102. Optionally, the first positioning operation information may further include the information about the third-party device 104.

Step S104: The LMF 101 receives the first message sent by the NEF 102.

Step S105: The LMF 101 obtains positioning configuration information of the UE 105.

Step S106: The LMF 101 determines, based on the positioning configuration information of the UE 105, whether the first positioning operation is allowed on the UE 105.

Step S107: The LMF 101 sends a third message to the NEF 102 based on a determining result. Optionally, if the LMF 101 determines that the first positioning operation is allowed on the UE 105, the LMF 101 may further send, after step S106, the identifier of the UE 105, the first positioning operation information, and the information about the third-party device 104 to a UDM 103, for the UDM 103 to store information related to a positioning operation on the UE 105. Optionally, after storing the identifier of the UE 105, the first positioning operation information, and the information about the third-party device 104, the UDM 103 may send a response message to the LMF 101.

Step S108: The NEF 102 receives a third message sent by the LMF 101.

Step S109: The NEF 102 sends a second message to the third-party device 104.

According to the foregoing method, the NEF 102 can implement a location service for the UE 105 based on a request of the third-party device 104, so that a location service capability of the LMF 101 is externally exposed.

In a feasible implementation, the identifier of the UE 105 that is sent by the third-party device 104 to the NEF 102 in step S101 may be the public UE identifier of the UE 105, to identify an identity of the UE 105. It should be noted that, in this embodiment of this application, a specific form of the identifier of the UE 105 that is transferred between nodes in a core network is not clearly limited. A form of the identifier of the UE 105 in the steps may also be converted, provided that the UE 105 can be uniquely identified. For example, in step S102, the NEF 102 may convert the received identifier of the UE 105 into a subscription permanent identifier (SUPI), and the UE 105 is identified in the core network by using the SUPI subsequently.

The first positioning operation information sent by the third-party device 104 may include or include only the type identifier and/or the parameter of the positioning operation that needs to be performed, to request the LMF 101 to perform the positioning operation based on the type identifier and/or the parameter of the positioning operation. Alternatively, the first positioning operation information may include or include only the type identifier and/or the parameter of the positioning operation that needs to be stopped, to request the LMF 101 to stop the positioning operation based on the type identifier and/or the parameter of the positioning operation. Alternatively, the first positioning operation information may include or include only the type identifier and/or the parameter of the positioning operation that needs to be modified, to request the LMF 101 to modify, based on the type identifier and/or the parameter of the positioning operation, a type identifier and/or a parameter of a positioning operation that has been performed or has not been performed.

Specifically, a type of a positioning operation may be that the LMF determines location information of the UE 105 based on a specified time interval and reports the location information of the UE 105 to the third-party device. In this case, a parameter of the positioning operation may be the specified time interval. Alternatively, a type of a positioning operation may be that when entering or leaving a specified area, the UE 105 reports the location information to the third-party device. In this case, a parameter of the positioning operation may be an identifier of the specified area, coordinate information of the specified area, and/or the like.

In addition, during implementation, alternatively, the first positioning operation information may include or include only the information about the third-party device, for example, the identifier of the third-party device, an IP address of the third-party device, or an identifier of an application program (for example, an App) that initiates a positioning operation in the third-party device. Because the UE 105 may be set to allow exposure of the location service only to a third-party device having one or more types of preset information, the third-party device 104 may add a part or all of information such as the identifier and the IP address of the third-party device 104 and the identifier of the application program that initiates the positioning operation to the first positioning operation information to be sent to the NEF 102.

In this embodiment of this application, the third-party device may further add the information about the third-party device when sending the identifier of the UE and the first positioning operation information, to indicate the third-party device that sends the identifier of the UE and the first positioning operation information. In addition, if the third-party device sends the identifier of the UE and the first positioning operation information to the NEF based on a request of an application program, for example, an APP, of the third-party device, the third-party device may further add an identifier of the application program when sending the identifier of the UE and the first positioning operation information, so that the third-party device notifies the application program of the received second message or information corresponding to the second message.

In a feasible implementation, in step S102, the NEF 102 may send the identifier of the UE 105 to the UDM 103, and receive information, returned by the UDM 103, about the LMF 101 that provides the location service for the UE 105. The information about the LMF 101 may be an identifier of the LMF 101 or an IP address of the LMF 101. Through this step, the UDM 103 may store the information about the LMF 101 that serves the UE 105. When the third-party device 104 requests a location of a specified user from the NEF 102, the NEF 102 may learn, from the UDM 103, of the LMF 101 that serves the UE 105.

During implementation, after receiving the identifier of the UE 105 that is sent by the NEF 102, the UDM 103 may determine, based on a previously stored correspondence between an identifier of UE and information about an LMF, the information about the LMF 101 that provides the location service for the UE 105. The correspondence between an identifier of UE and information about an LMF that is stored in the UDM 103 may be sent by the LMF to the UDM after the LMF determines to provide the location service for the UE. For example, after determining to provide the location service for the UE 105, the LMF 101 may send the identifier of the UE 105 and the information about the LMF 101 to the UDM 103, to indicate that the LMF 101 provides the location service for the UE 105. In this case, after receiving the identifier of the UE 105 that is sent by the NEF 102, the UDM 103 can determine that the LMF 101 is an LMF that provides the location service for the UE 105.

In another implementation, in step S102, after receiving the identifier of the UE 105 that is sent by the third-party device 104, the NEF 102 may determine, based on a first correspondence stored by the NEF 102, the LMF 101 that provides the location service for the UE 105. The first correspondence is a correspondence between an identifier of UE and information about an LMF that provides a location service for the UE. Specifically, the first correspondence may be obtained by the NEF 102 from the UDM 103. For example, the NEF 102 obtains an updated first correspondence from the UDM 103 at a preset time interval, or after the stored correspondence between an identifier of UE and information about an LMF that provides a location service for the UE changes, the UDM 103 sends changed content in the correspondence or a changed correspondence to the NEF 102, so that the NEF 102 can determine the first correspondence. The first correspondence may alternatively be a correspondence, previously determined by the NEF 102 based on the identifier of the UE 105 that is sent by the third-party device 104, between the identifier of the UE 105 and the LMF 101 that provides a service for the UE 105.

During implementation, the LMF 101 may determine, in a process in which the UE 105 requests registration from an AMF 107, to provide the location service for the UE 105. A feasible solution is as follows: After the AMF 107 receives a registration request sent by the UE 105, the AMF 107 may determine, based on service area information and the like of the LMF, to use the LMF 101 as an LMF that can provide a service for the UE 105, and the AMF 107 sends a fourth message to the LMF 101. The fourth message may be a location service activation request, and the fourth message may carry information indicating that the UE 105 enables the location service, to request the LMF 101 to provide the location service for the UE 105. After receiving the fourth message, the LMF 101 determines to provide the location service for the UE 105. In another feasible solution, the UE 105 sends, in a process of requesting registration from the AMF 107, a registration request that carries the positioning configuration information. After determining that the registration request includes the positioning configuration information of the UE 105, the AMF 107 determines to use the LMF 101 as an LMF that can provide a service for the UE 105. The positioning configuration information of the UE 105 may include information indicating that the UE 105 enables the location service, and the information indicating that the UE 105 enables the location service may be location service enabled indication information (LCS enabled indication) of the UE 105, or may be other information indicating that the UE 105 enables the location service.

In addition, during implementation, after determining to provide a service for the 105, the LMF 101 may further add, to a feedback message to be sent to the AMF 107, information identifying that the fourth message sent by the AMF 107 is received. In addition, the LMF 101 may further send the identifier and/or the coordinate information of the service area of the LMF 101 to the AMF 107. For example, the service area of the LMF may be an entire public land mobile network (PLMN), and the identifier of the service area of the LMF may be an identifier of the PLMN.

Specifically, the LMF 101 may determine, based on the positioning configuration information of the UE 105, whether to provide the location service for the UE 105. For example, the positioning configuration information of the UE 105 may include or include only location service subscription data of the UE 105, and the location service subscription data may be used to indicate a positioning operation that is allowed on the UE 105. For example, the location service subscription data may include a parameter indicating that the UE is allowed to initiate a positioning operation on the UE to a network to enable the UE to obtain the location information of the UE and a related positioning operation, or may include a parameter indicating that a network side device is allowed to initiate a positioning operation on the UE to enable the network side device to obtain the location information of the UE and a related positioning operation. The positioning configuration information of the UE 105 may further include or include only positioning privacy setting information (privacy profile) of the UE 105, and the positioning privacy setting information may be used to indicate a positioning operation that is not allowed on the UE 105. For example, the positioning privacy setting information may include information indicating that a positioning operation on the UE that is initiated by a device other than the UE is rejected. The positioning configuration information of the UE 105 may further include or include only location service exposure setting information of the UE 105. For example, the location service exposure setting information may include information indicating whether the UE 105 enables the location service; and/or information about a type and/or a parameter of a positioning operation that the third-party device is allowed to or not allowed to request the LMF to perform on the UE 105; and/or information about a third-party device that is allowed to and/or not allowed to perform a positioning operation on the UE 105. Specifically, the information about the third-party device may include an application ID. During implementation, the positioning configuration information of the UE 105 may be stored in the UDM 103. Before performing determining, the LMF 101 may obtain, from the UDM 103 based on the identifier of the UE 105, the positioning configuration information corresponding to the identifier of the UE 105.

In a feasible implementation, the positioning configuration information of the UE 105 may be sent by the UE 105 to the UDM 103 through a core network entity, namely, the AMF. For example, after the positioning configuration information changes, the UE 105 may send changed positioning configuration information to the LMF 101 through the AMF, and the positioning configuration information is sent by the LMF 101 to the UDM 103. In addition, the positioning configuration information of the UE 105 may alternatively be default content preconfigured in the UDM 103. For example, the UDM 103 stores, by default, positioning configuration information that is of the UE 105 and that indicates that all location services are allowed to be performed.

In a feasible implementation, the first message sent by the NEF 102 in step S103 further includes the identifier of the UE 105. In this case, in step 105, the LMF 101 may obtain the positioning configuration information of the UE 105 based on the identifier of the UE 105. The identifier of the UE in this step may be the SUPI.

During implementation, the LMF 101 may send the identifier of the UE 105 to the UDM 103, and receive the positioning configuration information of the UE 105 that is sent by the UDM 103. Specifically, after receiving the identifier of the UE 105 that is sent by the LMF 101, the UDM 103 may determine, based on a stored correspondence between an identifier of UE and positioning configuration information, the positioning configuration information corresponding to the UE 105, and then send the determined positioning configuration information to the LMF 101. In addition, if the LMF 101 stores the positioning configuration information of the UE 105, the LMF 101 may alternatively determine the positioning configuration information of the UE 105 from the locally stored positioning configuration information based on the identifier of the 105. For example, the LMF 101 obtains the positioning configuration information of the UE 105 from the UDM 103 in a process of determining whether to provide the location service for the UE 105, so that the LMF 101 may determine the positioning configuration information of the UE 105 based on the identifier of the UE 105 in the first message sent by the NEF 102.

Specifically, before step S105, the LMF 101 may receive the positioning configuration information sent by the UE 105, and then the LMF 101 may send the positioning configuration information sent by the UE 105 and the identifier of the UE 105 to the UDM 103. In this case, the LMF 101 may send the identifier of the UE 105 to the UDM 103 in step S105 to obtain the positioning configuration information of the UE 105. Alternatively, the LMF 101 may locally store the positioning configuration information sent by the UE 105 and establish a correspondence between the identifier of the UE 105 and the positioning configuration information of the UE 105. In this case, the LMF 101 may determine the positioning configuration information of the UE 105 based on the identifier of the UE 105 in step S105.

Specifically, the positioning configuration information of the UE 105 may be information that is determined and sent through the AMF 107 to the LMF 101 by the UE 105 after a positioning status or a related setting of the UE 105 changes. For example, after information indicating enabling or disabling of a positioning operation changes, the UE 105 may send the positioning configuration information to the AMF 107, where the positioning configuration information carries information about a change of the information indicating enabling or disabling of a positioning operation, for example, carries changed information identifying enabling or disabling of a positioning operation. In addition, when accessing the AMF 107 for the first time, the UE 105 may add the positioning configuration information determined by the UE 105 to the registration request to be sent to the AMF 107, and the AMF 107 may send the positioning configuration information to the LMF 101, so that the LMF 101 positions the UE 105.

The positioning configuration information of the UE 105 may include positioning status information of the UE 105, and the positioning status information is used to indicate a positioning operation allowed by the UE 105 and/or a positioning operation rejected by the UE 105, so that the LMF 101 may send the identifier of the UE 105 and the positioning status information of the UE 105 to the UDM 103 or store the identifier of the UE 105 and the positioning status information of the UE 105, or locally store the identifier of the UE 105 and the positioning status information of the UE 105. The positioning status information may be a type identifier and/or a parameter of a positioning operation that is allowed on the UE 105.

In step S106, the LMF 101 may determine, based on the positioning status information in the positioning configuration information of the UE 105, whether the first positioning operation is allowed on the UE 105. The positioning status information may be used to indicate the positioning operation allowed by the UE 105 and/or the positioning operation rejected by the UE 105. Specifically, the positioning status information of the UE 105 may include the type identifier and/or the parameter of the positioning operation that is allowed on the UE 105. After determining the positioning status information of the UE 105, the LMF 101 may determine whether the type identifier and/or the parameter of the positioning operation that is allowed on the UE 105 includes a type identifier and/or a parameter of a positioning operation that needs to be performed by the LMF 101 and that is indicated by the first positioning operation information. If the type identifier and/or the parameter of the positioning operation that is allowed to be performed on the UE 105 includes the type identifier and/or the parameter of the positioning operation that needs to be performed by the LMF 101 and that is indicated by the first positioning operation information, the LMF 101 determines that the first positioning operation is allowed to be performed; or if the type identifier and/or the parameter of the positioning operation that is allowed to be performed on the UE 105 does not include the type identifier and/or the parameter of the positioning operation that needs to be performed by the LMF 101 and that is indicated by the first positioning operation information, the LMF 101 determines that the first positioning operation is not allowed to be performed. In addition, the positioning status information of the UE 105 may alternatively include a type identifier and/or a parameter of a positioning operation that is allowed to be stopped on the UE 105, for the LMF 101 to determine whether the first positioning operation indicated by the first positioning operation information is allowed to be stopped. The positioning status information of the UE 105 may alternatively include a type identifier and/or a parameter of a positioning operation that is allowed to be modified on the UE 105, for the LMF 101 to determine whether a type identifier and/or a parameter of the positioning operation indicated by the first positioning operation information is allowed to be modified.

In addition, in step S106, after the LMF 101 determines that the first positioning operation is allowed on the UE 105, the LMF 101 may further determine second positioning operation information, to indicate a positioning operation that is allowed on the UE 105. The second positioning operation information may be the same as or different from the first positioning operation information. The LMF 101 may send the identifier of the UE 105 and the second positioning operation information to the NEF 102, so that the NEF 102 may store a correspondence between the identifier of the UE 105 and the second positioning operation information, or send the second positioning operation information to the third-party device 104, so that the third-party device 104 can determine content of a positioning operation performed by the LMF 101; or the NEF 102 may send the identifier of the UE 105 and the second positioning operation information to the UDM 103, for the UDM 103 to store a correspondence between the identifier of the UE 105 and the second positioning operation information; and/or the LMF 101 may send the identifier of the UE 105 and the second positioning operation information to the UDM 103, for the UDM 103 to store a correspondence between the identifier of the UE 105 and the second positioning operation information.

An example in which the positioning operation is a positioning operation that needs to be performed by the LMF 101 is used. If the LMF 101 determines that the first positioning operation that needs to be performed and that is indicated by the first positioning operation information is included in an operation that is allowed on the UE 105, the LMF 101 may send the first positioning operation information as the second positioning operation information to the NEF 102 or the UDM 103. In another implementation, if the LMF 101 determines that a type of the positioning operation that needs to be performed and that is indicated by the first positioning operation information is a type of a positioning operation that is allowed by the UE 105, the LMF 101 may determine to accept a request for the positioning operation indicated by the first positioning operation information, determine a second positioning operation based on a type identifier and/or a parameter of the positioning operation that is allowed on the UE 105 (in this case, a parameter of the second positioning operation may be different from a parameter of the first positioning operation), and perform the second positioning operation. The LMF 101 may determine, based on at least one of a plurality of factors such as network load caused by performing the first positioning operation, whether a positioning capability of the network allows the first positioning operation, and whether the parameter of the first positioning operation is a parameter of the positioning operation that is allowed on the UE 105, whether to determine the second positioning operation based on the type identifier and/or the parameter of the positioning operation that is allowed on the UE 105.

For example, if the first positioning operation indicates that the LMF 101 needs to periodically report a location of the UE 105 at an interval of 3 minutes, but the LMF 101 can avoid network overload caused by frequent positioning of a terminal, so that the LMF changes, based on a network load management policy, parameter information, namely, "a time interval for UE periodic reporting" to 5 minutes. To be specific, the second positioning operation requires the LMF 101 to determine and report the location of the UE at an interval of 5 minutes. In another case, a "positioning precision" parameter described in parameter information of the first positioning operation is 20 meters, but the LMF changes the positioning precision parameter to 30 meters based on a positioning capability of a current network or UE location precision that is allowed to be externally provided. Specifically, the LMF 101 may use, in the positioning operation that is allowed on the UE 105, a positioning operation whose positioning operation type is the same as the type of the first positioning operation indicated by the first positioning operation information and whose positioning operation parameter is closest to the parameter of the first positioning operation indicated by the first positioning operation information, as the second positioning operation. In this case, the LMF 101 may send, to the NEF 102, a third message carrying accept information, and the LMF 101 may further add the second positioning operation information to the third message. The second positioning operation information includes a type identifier and/or a parameter of the second positioning operation, to indicate that the LMF 101 accepts a request for the positioning operation, and the positioning operation is the second positioning operation that is performed based on the second positioning operation information.

According to the foregoing method, the UDM 103 can obtain the identifier of the UE 105 and the second positioning operation information from the NEF 102 or the LMF 101, so that the UDM 103 can store the correspondence between the identifier of the UE 105 and the second positioning operation information in the positioning configuration information corresponding to the UE 105. The correspondence is used by the UDM 103 to determine, after the UDM 103 receives the identifier of the UE 105 that is sent by the LMF, the second positioning operation information corresponding to the identifier of the UE 105, so that the LMF can perform the positioning operation on the UE 105 based on the second positioning operation information. The LMF may be the LMF 101, or may be another LMF. Therefore, even if the correspondence between the identifier of the UE 105 and the second positioning operation information that is stored in the LMF 101 is lost or discarded, or the LMF that provides the location service for the UE 105 changes to an LMF other than the LMF 101 due to a reason such as a location change of the UE 105, the LMF that provides the location service for the UE 105 can still obtain, from the UDM 103, the second positioning operation information corresponding to the UE 105, to implement a continuation of the location service for the UE 105.

Specifically, the second positioning operation information may include the positioning operation that is allowed on the UE 105, for example, information used to indicate that the LMF 101 is requested to position the UE 105 based on the type identifier and/or the parameter of the positioning operation; or may include information that is of the UE 105 and that is used to indicate that the LMF 101 is requested to stop positioning the UE 105 based on the type identifier and/or the parameter of the positioning operation; or may include information used to indicate that the LMF 101 is requested to modify the type identifier and/or the parameter of the positioning operation that is used as a basis when the UE 105 is positioned, based on the type identifier and/or parameter of the positioning operation.

In step S107, after determining that the first positioning operation is allowed on the UE 105, the LMF 101 may add accept information and/or generated. positioning information to the third message to be sent to the NEF 102, to indicate that a request for performing the first positioning operation on the UE 105 that is sent by the NEF 102 is accepted. The accept information may be an accept indication, an acknowledgement character (acknowledgement, ACK), or other accept information indicating that the first positioning operation is allowed to be performed. The generated positioning information may be location information of the UE 105 that is determined by the LMF 101 after the LMF 101 performs the first positioning operation on the UE 105 based on the first positioning operation information. In addition, after determining that the first positioning operation is not allowed on the UE 105, the LMF 101 may add reject information to the third message to be sent to the NEF 102, to indicate that a request for performing the first positioning operation on the UE 105 that is sent by the NEF 102 is rejected. The reject information may be a reject indication, a negative acknowledgement character (NACK), or other information indicating that the first positioning operation is not allowed to be performed.

In step S109, the NEF 102 may send the second message to the third-party device 104 after receiving the third message sent by the LMF 101. If the third message sent by the LMF 101 includes the positioning information generated by the LMF 101, the NEF 102 may add the positioning information to the second message and send the second message to the third-party device 104, to provide the positioning information of the UE 105 to the third-party device based on a request of the third-party device 104. In addition, the NEF 102 may further add, to the second message, the accept information or the reject information carried in the third message.

A positioning operation method provided in an embodiment of this application is described below by using FIG. 8 to FIG. 10A and FIG. 10B as an example.

Embodiment 1

Figure 8:
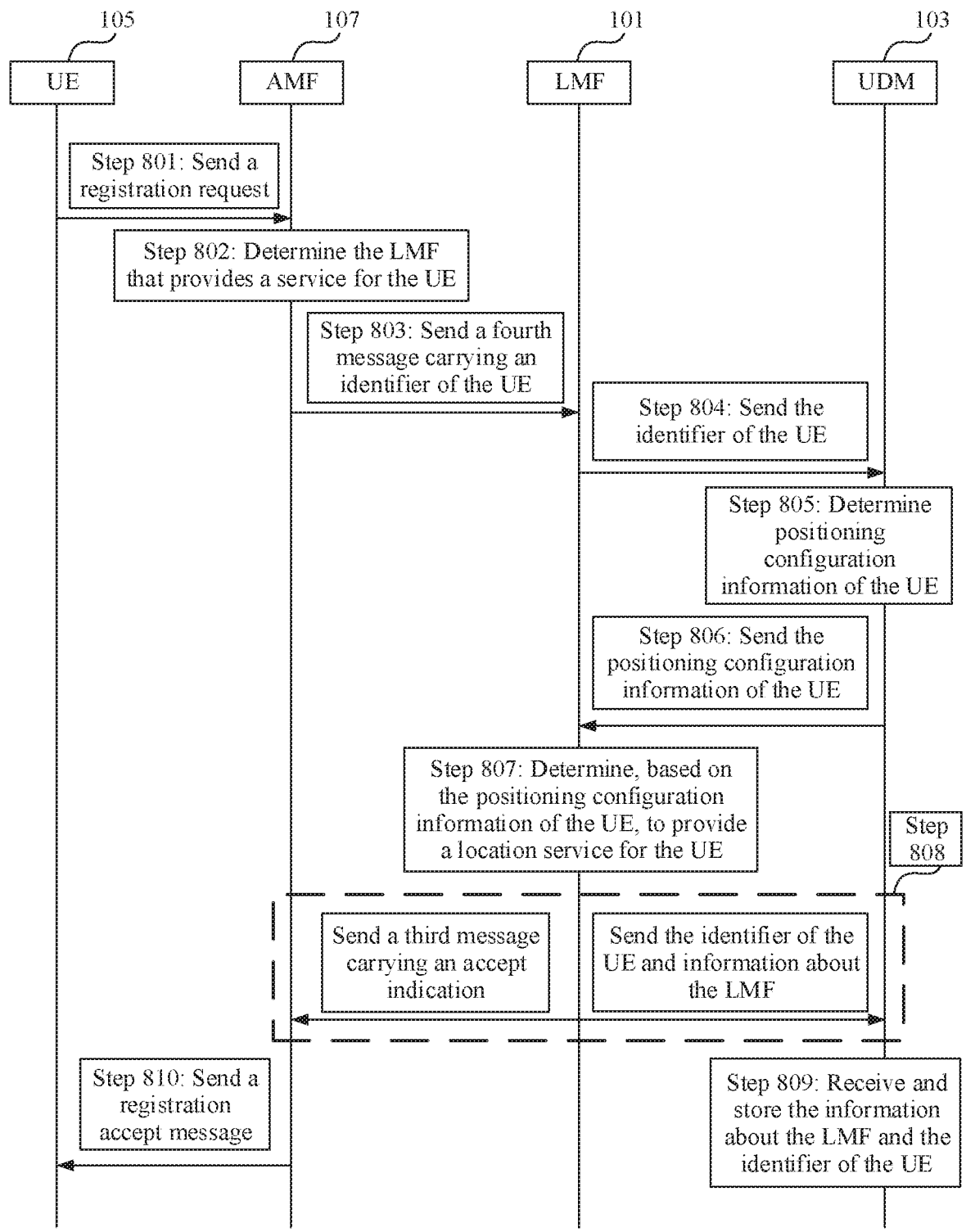
FIG. 8 is a schematic flowchart (2) of a positioning operation method according to an embodiment of this application.

The positioning operation system shown in FIG. 1 is used as an example. In a positioning operation method provided in this embodiment of this application, a schematic flowchart in which when the UE 105 registers with a wireless network, the LMF 101 determines to provide a location service for the UE 105 and sends an identifier of the UE 105 and information about the LMF 101 to the UDM 103 is shown in FIG. 8. The method includes the following steps:

Step 801: The UE 105 sends a registration request to the AMF 107. Optionally, the UE 105 adds positioning configuration information of the UE 105 to the registration request to be sent to the AMF 107. The positioning configuration information of the UE 105 may be information indicating that the UE 105 enables a positioning operation.

Step 802: The AMF 107 processes/performs a service registration procedure of the UE 105, and uses the LMF 101 as an LMF that can provide the location service for the UE 105. Optionally, after determining that the registration request of the UE 105 carries the positioning configuration information, the AMF 107 uses the LMF 101 as the LMF that can provide the location service for the UE 105.

Step 803: The AMF 107 sends a fourth message to the LMF 101, where the fourth message carries the identifier of the UE 105, to request the LMF 101 to determine whether to provide the location service for the UE 105.

Step 804: After receiving the fourth message carrying the identifier of the UE 105, the LMF 101 sends the identifier of the UE 105 to the UDM 103, for the UDM 103 to obtain the positioning configuration information of the UE 105 to determine whether to provide the location service for the UE 105.

Step 805: The UDM 103 determines, based on the identifier of the UE 105 and a correspondence between an identifier of UE and positioning configuration information, the positioning configuration information corresponding to the identifier of the UE 105. The correspondence between an identifier of UE and positioning configuration information may be preset or may be updated by the UDM 103 based on a correspondence that is between an identifier of UE and positioning configuration information and that is reported by the LMF.

Step 806: The UDM 103 sends the positioning configuration information of the UE 105 to the LMF 101.

Step 807: The LMF 101 determines, based on the positioning configuration information of the UE 105, to provide the location service for the UE 105.

Step 808: The LMF 101 sends, to the AMF 107, a third message carrying an accept indication, where the third message carries information about a service area of the LMF 101, and the information about the LMF 101 and the identifier of the UE 105 that are sent by the LMF 101 to the UDM 103.

Step 809: The UDM 103 receives and stores the information about the LMF 101 and the identifier of the UE 105 that are sent by the LMF 101, for the UDM 103 to determine, after the UDM 103 receives the identifier of the UE 105 that is sent by the NEF based on the third-party device, the LMF that provides the location service for the UE 105 to which the identifier of the UE 105 belongs.

Step 810: The AMF 107 sends a registration accept message to the UE 105, to indicate that a registration process of the UE 105 is completed, and then this procedure ends.

According to the foregoing method, the UDM 103 can obtain a correspondence between the identifier of the UE 105 and the information about the LMF 101 that provides a service for the UE 105. Based on the correspondence, the UDM 103 can determine, based on the identifier of the UE 105 that is sent by the NEF 102, the information about the LMF 101 that provides the location service for the UE 105, and send the information about the LMF 101 to the NEF 102 in step S102. Therefore, in step S103, the NEF 102 can determine, based on the identifier of the UE 105, the information about the LMF 101 that provides a service for the UE 105, and further send a first message to the LMF 101.

In addition, during implementation, the UE 105 may further add positioning configuration information of the UE 105 to the registration request to be sent to the AMF 107 in step 801. The positioning configuration information may include information indicating that the UE 105 enables the location service or include information about a positioning operation that is allowed on the UE 105, to indicate that the UE 105 enables the location service. In this case, the AMF 107 may allocate the LMF 101 to the UE 105 based on the positioning configuration information of the UE 105, and send the positioning configuration information to the LMF 101 allocated to the UE. Subsequently, in step 808, the LMF 101 may send the positioning configuration information of the UE 105 and the identifier of the UE 105 to the UDM 103, for the UDM 103 to store the positioning configuration information of the UE 105, so that the UDM 103 can obtain the correspondence between the identifier of the UE 105 and the positioning configuration information of the UE 105, to provide, after the LMF that provides a service for the UE 105 changes, the positioning configuration information of the UE 105 to a changed LMF. Specifically, after receiving the identifier of the UE 105 that is sent by the LMF that provides a service for the UE 105, the UDM 103 may send the positioning configuration information of the UE 105 to the LMF.

Embodiment 2

The positioning operation system shown in FIG. 1 is still used as an example. If positioning configuration information of the UE 105 changes, the UE 105 may send positioning configuration information to the LMF 101 through the AMF 107 after the positioning configuration information changes, and then the LMF 101 sends the positioning configuration information of the UE 105 to the UDM 103 for storage. Alternatively, the UE 105 may send the positioning configuration information of the UE 105 to the LMF 101 through the AMF 107 at an interval of preset duration, or after a preset time is reached, and then the LMF 101 sends the positioning configuration information of the UE 105 to the UDM 103 for storage.

Figure 9:
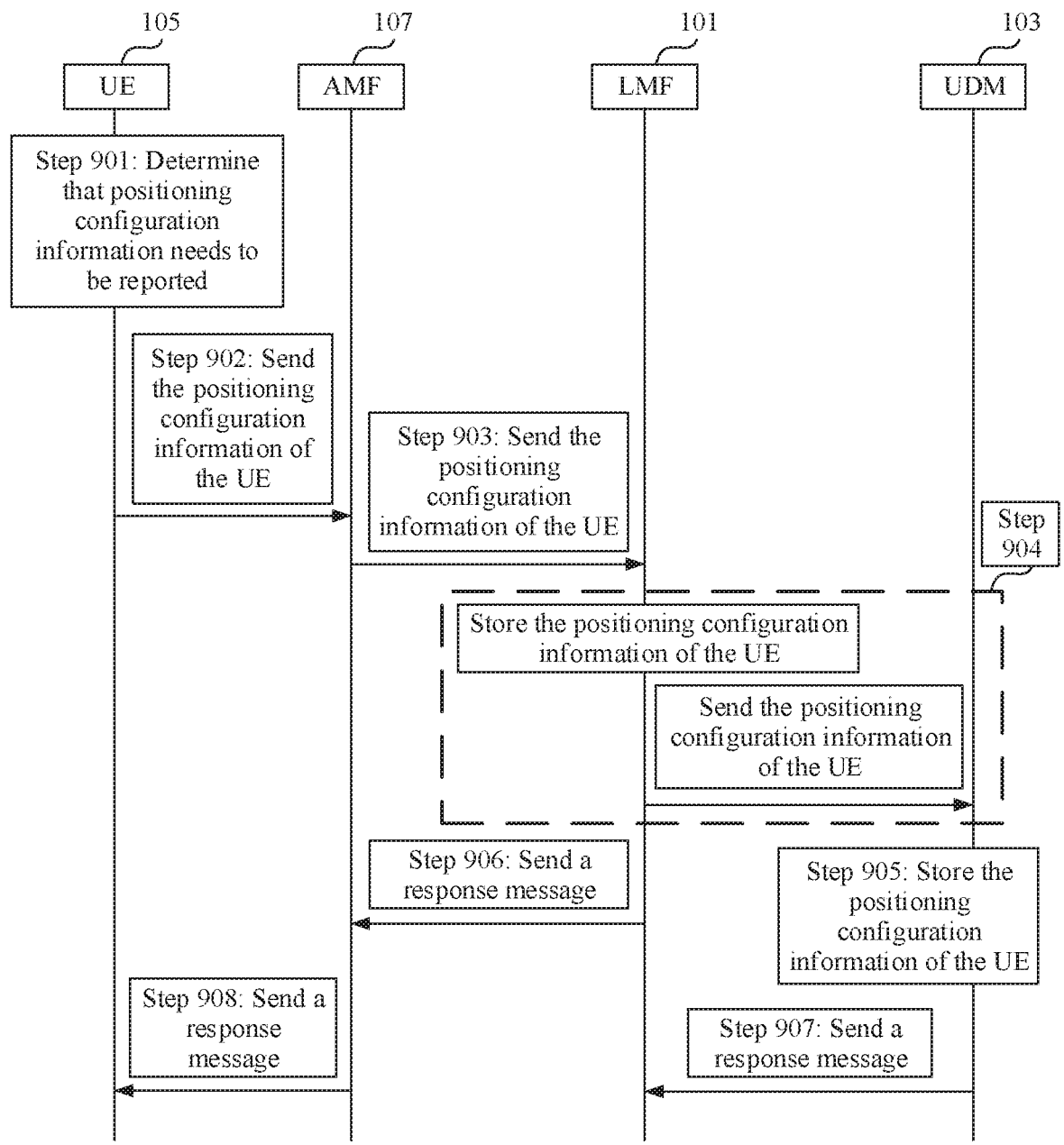
FIG. 9 is a schematic flowchart (3) of a positioning operation method according to an embodiment of this application.

A detailed process in which the UE 105 reports the positioning configuration information of the UE 105 to the LMF 101 and the UDM 103 through the AMF 107 is shown in FIG. 9, and includes the following steps:

Step 901: The UE 105 determines that the positioning configuration information of the UE 105 needs to be reported. After the positioning configuration information of the UE 105 changes, at an interval of preset duration, or after a preset time is reached, the UE 105 may determine that the positioning configuration information of the UE 105 needs to be reported Step 902: The UE 105 sends the positioning configuration information to the AMF 107, where the positioning configuration information reported by the UE 105 may be only changed positioning configuration information, or may be all positioning configuration information of the UE 105. Optionally, the positioning configuration information reported by the UE 105 may be information indicating whether the UE 105 enables a location service.

Step 903: The AMF 107 sends the positioning configuration information of the UE 105 to the LMF 101.

Step 904: After receiving the positioning configuration information of the UE 105, the LMF 101 locally stores a correspondence between an identifier of the UE 105 and the positioning configuration information, sends the identifier of the UE 105 and the positioning configuration information of the UE 105 to the UDM 103, and then performs step 905 and step 906.

Step 905: After receiving the identifier of the UE 105 and the positioning configuration information of the UE 105, the UDM 103 stores the correspondence between the identifier of the UE 105 and the positioning configuration information, and then performs step 907.

Step 906: The LMF 101 sends, to the AMF 107, a response message indicating that the positioning configuration information of the UE 105 is already received, and then performs step 908.

Step 907: The UDM 103 sends, to the LMF 101, a response message indicating that the correspondence between the identifier of the UE 105 and the positioning configuration information is already stored, and then this procedure ends.

Step 908: The AMF 107 sends, to the UE 105, a response message indicating that the LMF 101 already accepts the positioning configuration information of the UE 105, and then this procedure ends.

According to the foregoing method, the positioning configuration information of the UE 105 may be stored in the LMF 101 and the UDM 103, so that after the LMF 101 receives first positioning operation information for the UE 105, the LMF 101 determines, based on the locally stored positioning status information of the UE 105 or based on positioning status information of the UE 105 that is stored in the UDM 103, whether a first positioning operation is allowed on the UE 105.

Embodiment 3

Figure 10A:
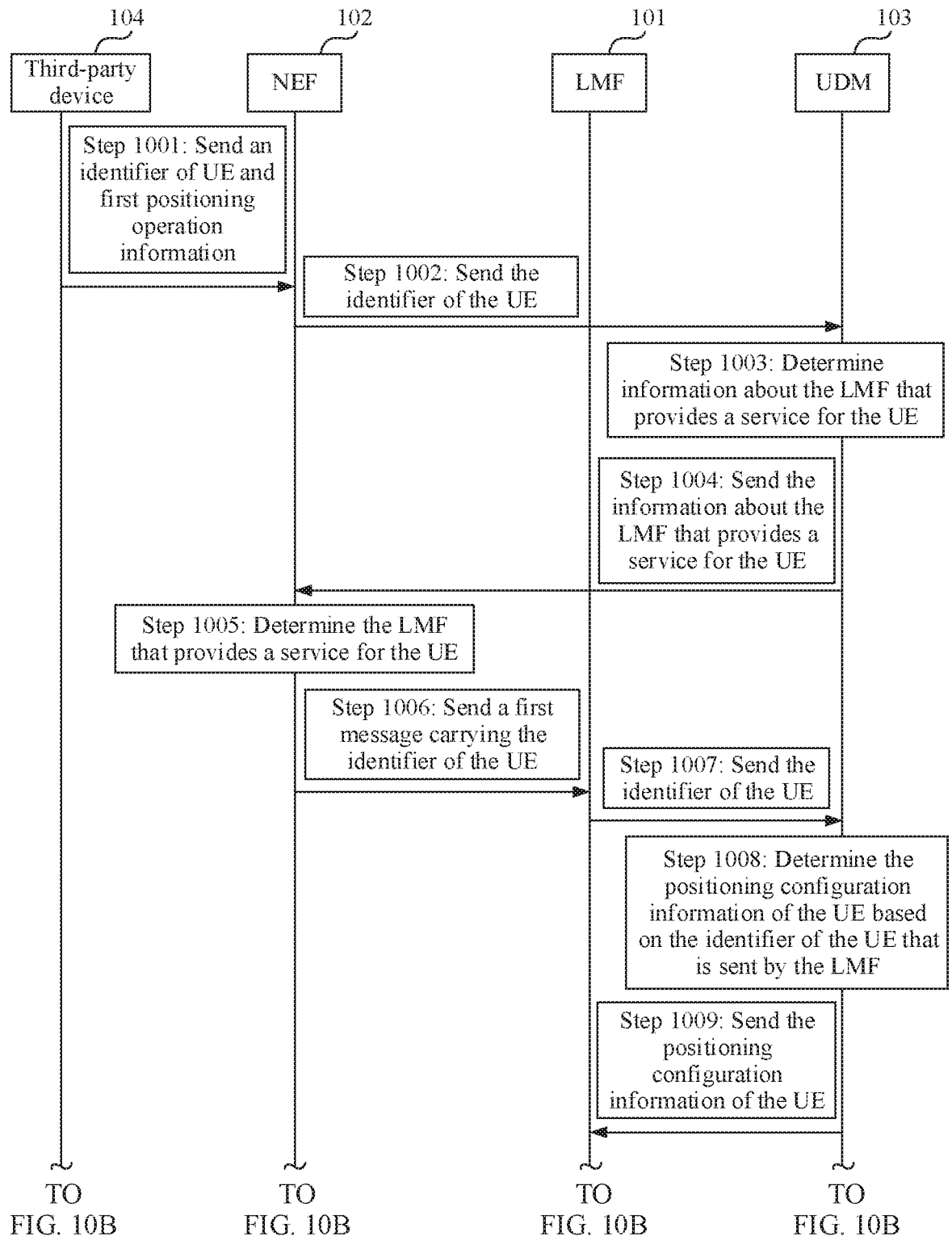
FIG. 10A and FIG. 10B are a schematic flowchart (4) of a positioning operation method according to an embodiment of this application.
Figure 10B:
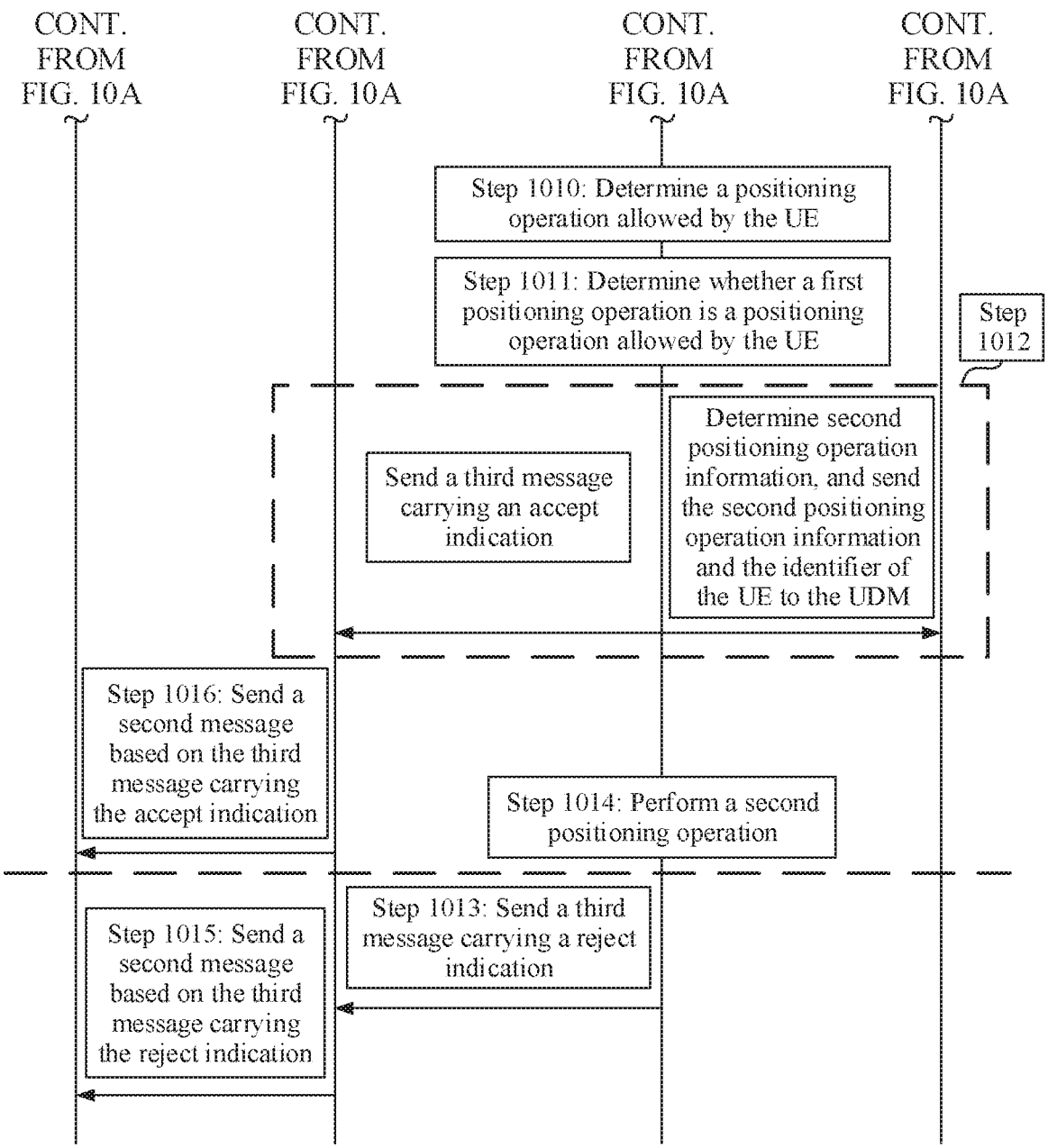

The positioning operation system shown in FIG. 1 is still used as an example. If a first App in the third-party device 104 requests, from the NEF 102, obtaining of location information of the UE 105 at an interval of 10 minutes, a specific schematic flowchart of a positioning operation method provided in this embodiment of this application is shown in FIG. 10A and FIG. 10B. The procedure specifically includes the following steps:

Step 1001: The third-party device 104 sends a public UE identifier of the UE 105 and first positioning operation information to the NEF 102. A type of a positioning operation indicated by the first positioning operation information is positioning the UE at an interval of preset duration, a parameter of the positioning operation indicated by the first positioning operation information is information indicating that the preset duration is 10 minutes, and the first positioning operation information further includes an identifier of the first App.

Step 1002: After receiving the identifier of the UE 105 and the first positioning operation information, the NEF 102 sends the identifier of the UE 105 to the UDM 103.

Step 1003: The UDM 103 receives the identifier of the UE 105 that is sent by the NEF 102, and determines, based on a correspondence between an identifier of UE and an LMF that provides a location service for the UE, information about the LMF 101 corresponding to the identifier of the UE 105. The correspondence between an identifier of UE and an LMF that provides a location service for the UE may be obtained, according to the method shown in FIG. 8, by the UDM 103 from the LMF that provides a service for the UE, and the identifier of the UE 105 may be an SUPI of the UE 105.

Step 1004: The UDM 103 sends the determined information about the LMF 101 to the NEF 102.

Step 1005: The NEF 102 determines the LMF 101 based on the information about the LMF 101 that is sent by the UDM 103.

Step 1006: The NEF 102 sends a first message to the LMF 101. The first message includes the identifier of the UE 105 and the first positioning operation information, and the identifier of the UE 105 may be the SUPI of the UE 105.

Step 1007: The LMF 101 sends the identifier of the UE 105 to the UDM 103.

Step 1008: The UDM 103 receives the identifier of the UE 105 that is sent by the LMF 101, and determines, based on a correspondence between an identifier of UE and positioning configuration information, the positioning configuration information corresponding to the identifier of the UE 105. The UE correspondence between an identifier of UE and positioning configuration information may be sent by the LMF 101 to the UDM 103 according to the method shown in FIG. 9.

Step 1009: The UDM 103 sends the positioning configuration information of the UE 105 to the LMF 101.

Step 1010: The LMF 101 determines, based on the positioning configuration information of the UE 105, a positioning operation allowed by the UE 105.

Step 1011: The LMF 101 determines whether a first positioning operation is a positioning operation allowed by the UE 105; and if the first positioning operation is a positioning operation allowed by the UE 105, the LMF 101 determines that the first positioning operation is allowed on the UE 105, and performs step 1012; or if the first positioning operation is not a positioning operation allowed by the UE 105, the LMF 101 does not allow the first positioning operation to be performed on the UE 105, and performs step 1013.

Step 1012: The LMF 101 sends, to the NEF 102, a third message including an accept indication, determines second positioning operation information based on the first positioning operation information, sends the second positioning operation information and the identifier of the UE 105 to the UDM 103, and then performs step 1014. The identifier of the UE 105 may be the SUPI of the UE 105, and the second positioning operation information may be used to indicate a positioning operation that is allowed on the UE 105, for example, a type of the positioning operation indicated by the second positioning operation information may be positioning the UE at an interval of preset duration, and a parameter of the positioning operation indicated by the second positioning operation information may be information indicating that the preset duration is 10 minutes.

Step 1013: The LMF 101 sends, to the NEF 102, a third message including a reject indication, and then performs step 1013.

Step 1014: The LMF 101 performs a second positioning operation based on the second positioning operation information, and then this procedure ends.

Step 1015: The NEF 102 sends a second message to the third-party device 104 based on the third message including reject indication, and then this procedure ends.

Step 1016: The NEF 102 sends a second message to the third-party device 104 based on the third message including accept indication, and then this procedure ends.

Specifically, in step 1012, the LMF 101 may position the UE 105, stops the positioning operation, or modifies the type and/or the parameter of the positioning operation based on a type identifier and/or the parameter of the positioning operation indicated by the second positioning operation information.

In another feasible implementation, referring to the specific schematic flowchart of the positioning operation method shown in FIG. 10A and FIG. 10B, in step 1012, the LMF 101 may further add the determined second positioning operation information and the identifier of the UE 105 to the third message to be sent to the NEF 102, and the second positioning operation information and the identifier of the UE 105 may not need to be sent to the UDM 103 any longer. After receiving the second positioning operation information and the identifier of the UE 105, the NEF 102 may send the second positioning operation information and the identifier of the UE 105 to the third-party device 104 and/or the UDM 103, so that the third-party device 104 can learn of information about the second positioning operation performed by the LMF 101; and/or the UDM 103 can store the information about the second positioning operation performed by the LMF 101. Subsequently, when the LMF 101 or another LMF performs a positioning operation on the UE 105, the information about the second positioning operation that needs to be performed can be quickly determined.

Based on an inventive concept the same as that of the method embodiments, an embodiment of this application further provides an apparatus 1100. The apparatus 1100 is applied to a location management function entity. The apparatus 1100 may be specifically a processor, a chip, a chip system, a functional module, or the like in the location management function entity. The apparatus may include a sending unit 1101, a receiving unit 1102, and a processing unit 1103. The processing unit 1103 is configured to control and manage an action of the apparatus 1100. The sending unit 1101 is configured to perform step S107. The receiving unit 1102 is configured to perform step S104. The processing unit 1103 is configured to perform step S105 and step S106. Repeated parts are not described in detail herein again. The processing unit 1103 may be further configured to indicate a processing process of the location management function entity (including the LMF 101) in any one of the foregoing embodiments and/or another process in the technical solutions described in this application.

In hardware implementation, the processing unit 1103 may be a processor, a processing circuit, or the like. The sending unit 1101 may be a transmitter, a transmitter circuit, or the like. The receiving unit 1102 may be a receiver, a receiver circuit, or the like. The sending unit 1101 and the receiving unit 1102 may form a transceiver.

For a possible schematic logical structural diagram that is of the location management function entity 101 in the foregoing embodiment and that is provided in this embodiment of this application, refer to FIG. 2. The location management function entity 101 includes a processor 203. In this embodiment of this application, the processor 203 is configured to control and manage an action of the location management function entity 101. For example, the processor 203 is configured to support a related step of determining first information by the location management function entity 101 in this embodiment. Optionally, the location management function entity 101 may further include a transceiver 201 and a memory 202. The transceiver 201, the memory 202, and the processor 203 may be connected to each other or may be connected to each other by using a bus structure 204. The memory 202 is configured to store code and data of the location management function entity 101. The transceiver 201 is configured to support the location management function entity 101 in performing communication.

In the location management function entity 101 shown in FIG. 2, the processor 203 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor.

Figure 12:
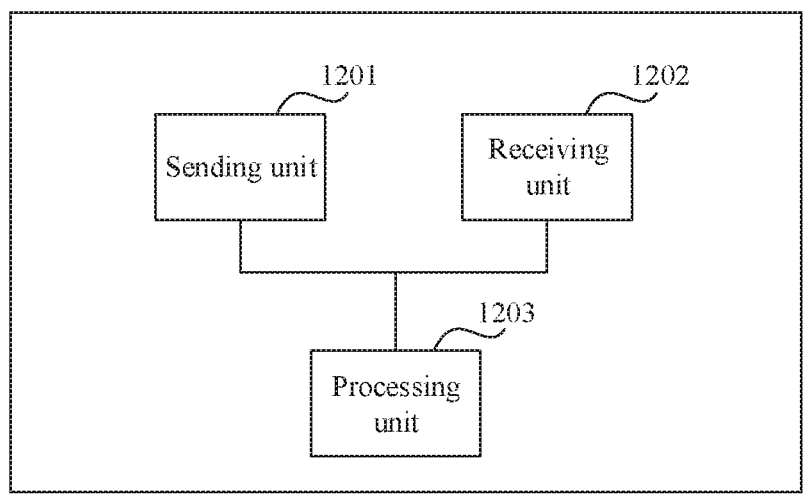
FIG. 12 is a schematic structural diagram of another network exposure function entity for a positioning operation according to an embodiment of this application.

Based on an inventive concept the same as that of the method embodiments, an embodiment of this application further provides an apparatus 1200. The apparatus 1200 is applied to a network exposure function entity. The apparatus 1200 may be specifically a processor, a chip, a chip system, a functional module, or the like in the network exposure function entity. The apparatus may include a sending unit 1201, a receiving unit 1202, and a processing unit 1203. As shown in FIG. 12, the processing unit 1203 is configured to control and manage an action of the apparatus 1200. The sending unit 1201 is configured to perform step S103 and step S109. The receiving unit 1202 is configured to perform step S101 and S108. The processing unit 1203 is configured to perform step S102. Repeated parts are not described in detail herein again. The processing unit 1203 may be further configured to indicate a processing process of the network exposure function entity (including the NEF 102) in any one of the foregoing embodiments and/or another process in the technical solutions described in this application.

In hardware implementation, the processing unit 1203 may be a processor, a processing circuit, or the like. The sending unit 1201 may be a transmitter, a transmitter circuit, or the like. The receiving unit 1202 may be a receiver, a receiver circuit, or the like. The sending unit 1201 and the receiving unit 1202 may form a transceiver.

For a possible schematic logical structural diagram that is of the network exposure function entity 102 in the foregoing embodiment and that is provided in this embodiment of this application, refer to FIG. 3. The network exposure function entity 102 includes a processor 303. In this embodiment of this application, the processor 303 is configured to control and manage an action of the network exposure function entity 102. For example, the processor 303 is configured to support a related step of determining first information by the network exposure function entity 102 in this embodiment. Optionally, the network exposure function entity 102 may further include a transceiver 301 and a memory 302. The transceiver 301, the memory 302, and the processor 303 may be connected to each other or may be connected to each other by using a bus structure 304. The memory 302 is configured to store code and data of the network exposure function entity 102. The transceiver 301 is configured to support the network exposure function entity 102 in performing communication.

In the network exposure function entity 102 shown in FIG. 3, the processor 303 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor.

Figure 13:
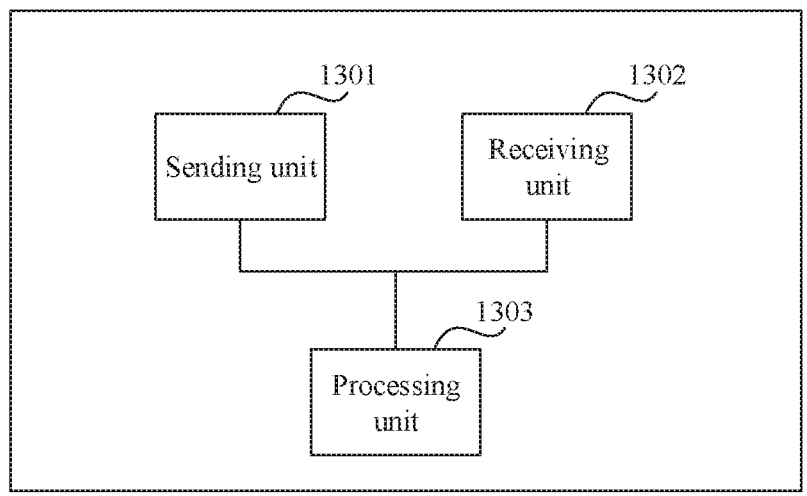
FIG. 13 is a schematic structural diagram of another unified data management platform for a positioning operation according to an embodiment of this application.

Based on an inventive concept the same as that of the method embodiments, an embodiment of this application further provides an apparatus 1300. The apparatus 1300 is applied to a unified data management platform. The apparatus 1300 may be specifically a processor, a chip, a chip system, a functional module, or the like in the unified data management platform. As shown in FIG. 13, the apparatus may include a sending unit 1301, a receiving unit 1302, and a processing unit 1303. The sending unit 1301 is used by the apparatus 1300 to send information. The receiving unit 1302 is used by the apparatus 1300 to receive information. The processing unit 1303 is configured to control and manage an action of the apparatus 1300. The processing unit 1303 may be further configured to indicate a processing process of the unified data management platform (including the UDM 103) in any one of the foregoing embodiments and/or another process in the technical solutions described in this application.

In hardware implementation, the processing unit 1303 may be a processor, a processing circuit, or the like. The sending unit 1301 may be a transmitter, a transmitter circuit, or the like. The receiving unit 1302 may be a receiver, a receiver circuit, or the like. The sending unit 1301 and the receiving unit 1302 may form a transceiver.

For a possible schematic logical structural diagram that is of the unified data management platform 103 in the foregoing embodiment and that is provided in this embodiment of this application, refer to FIG. 4. The unified data management platform 103 includes a processor 403. In this embodiment of this application, the processor 403 is configured to control and manage an action of the unified data management platform 103. For example, the processor 403 is configured to support a related step of determining first information by the unified data management platform 103 in this embodiment. Optionally, the unified data management platform 103 may further include a transceiver 401 and a memory 402. The transceiver 401, the memory 402, and the processor 403 may be connected to each other or may be connected to each other by using a bus structure 404. The memory 402 is configured to store code and data of the unified data management platform 103. The transceiver 401 is configured to support the unified data management platform 103 in performing communication.

In the unified data management platform 103 shown in FIG. 4, the processor 403 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor.

Figure 14:
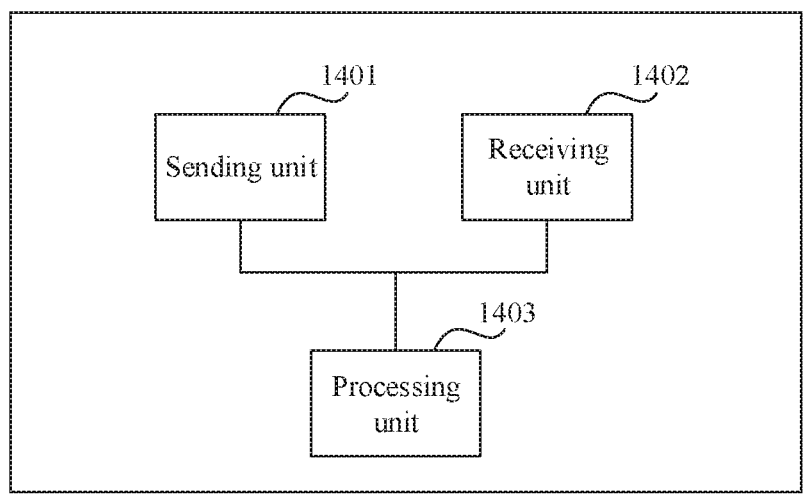
FIG. 14 is a schematic structural diagram of another terminal for a positioning operation according to an embodiment of this application.

Based on an inventive concept the same as that of the method embodiments, an embodiment of this application further provides an apparatus 1400. The apparatus 1400 is applied to a terminal. The apparatus 1400 may be specifically a processor, a chip, a chip system, a functional module, or the like in the terminal. As shown in FIG. 14, the apparatus may include a sending unit 1401, a receiving unit 1402, and a processing unit 1403. The sending unit 1401 is used by the apparatus 1400 to send information. The receiving unit 1402 is used by the apparatus 1400 to receive information. The processing unit 1403 is configured to control and manage an action of the apparatus 1400. The processing unit 1403 may be further configured to indicate a processing process of the terminal (including the UE 105) in any one of the foregoing embodiments and/or another process in the technical solutions described in this application.

In hardware implementation, the processing unit 1403 may be a processor, a processing circuit, or the like. The sending unit 1401 may be a transmitter, a transmitter circuit, or the like. The receiving unit 1402 may be a receiver, a receiver circuit, or the like. The sending unit 1401 and the receiving unit 1402 may form a transceiver.

For a possible schematic logical structural diagram that is of the terminal 105 in the foregoing embodiment and that is provided in this embodiment of this application, refer to FIG. 6. The terminal 105 includes a processor 603. In this embodiment of this application, the processor 603 is configured to control and manage an action of the terminal 105. For example, the processor 603 is configured to support a related step of determining first information by the terminal 105 in this embodiment. Optionally, the terminal 105 may further include a transceiver 601 and a memory 602. The transceiver 601, the memory 602, and the processor 603 may be connected to each other or may be connected to each other by using a bus structure 604. The memory 602 is configured to store code and data of the terminal 105. The transceiver 601 is configured to support the terminal 105 in performing communication.

In the terminal 105 shown in FIG. 6, the processor 603 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor.

Based on a concept the same as that of the foregoing method embodiments, an embodiment of this application further provides a positioning operation syste. The system may include a location management function entity. In addition, during implementation, the positioning operation system may further include one or more of a unified data management platform, a terminal, or a network exposure function entity. In addition, the system may further include another device, for example, an access and mobility management function entity or a radio access network, that can interact with one or more of the location management function entity, the unified data management platform, the terminal, or the network exposure function entity.

Figure 11:
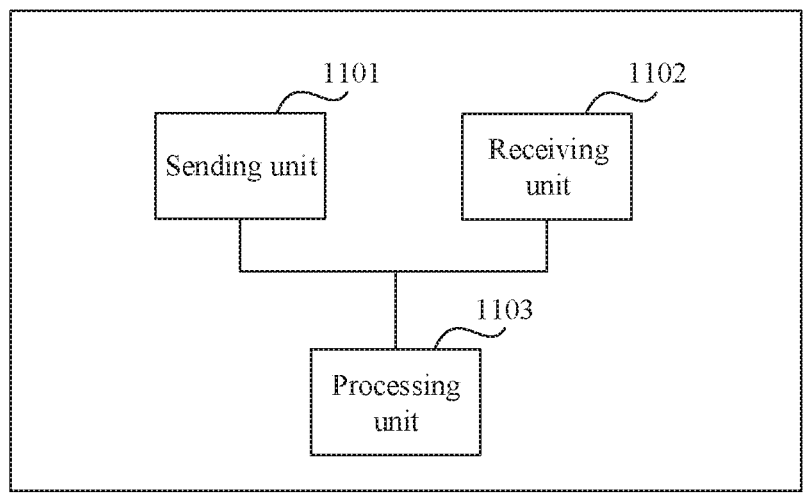
FIG. 11 is a schematic structural diagram of another location management function entity for a positioning operation according to an embodiment of this application.
Figure 15:
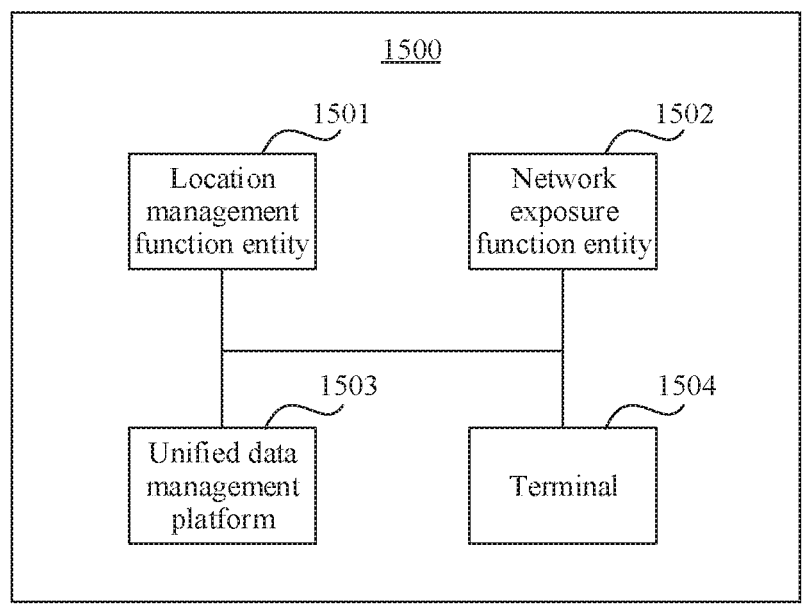
FIG. 15 is a schematic structural diagram of another positioning operation system according to an embodiment of this application.

As shown in FIG. 15, a positioning operation system 1500 provided in an embodiment of this application includes a location management function entity 1501, a network exposure function entity 1502, a unified data management platform 1503, and a terminal 1504. The location management function entity 1501 may have the structure shown in FIG. 2 or FIG. 11, the network exposure function entity 1502 may have the structure shown in FIG. 3 or FIG. 12, the unified data management platform 1503 may have the structure shown in FIG. 4 or FIG. 13, and the terminal 1504 may have the structure shown in FIG. 6 or FIG. 14.

Based on a same concept as the foregoing method embodiments, an embodiment of this application further provides a computer-readable storage medium, storing some instructions. When these instructions are invoked and executed by a computer, the computer may be enabled to complete the method in any one of the foregoing method embodiments and the possible designs of the method embodiments. In this embodiment of this application, the computer-readable storage medium is not limited. For example, the computer-readable storage medium may be a RAM (random-access memory) or a ROM (read-only memory).

Based on a same concept as the foregoing method embodiments, this application further provides a computer program product. When being invoked and executed by a computer, the computer program product can implement the method in any one of the method embodiments and the possible designs of the foregoing method embodiments.

Based on a concept the same as that of the foregoing method embodiments, this application further provides a chip. The chip is coupled to a transceiver, and is configured to complete the method in any one of the foregoing method embodiments and the possible implementations of the method embodiments. "Coupling" means that two components are directly or indirectly combined with each other, the combination may be fixed or movable, and the combination may allow communication of a fluid, electricity, an electrical signal, or another type of signal between the two parts.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM (a compact disc read-only memory), an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, persons skilled in the art can make other changes and modifications to these embodiments once they learn the basic inventive concept. Therefore, the following claims are intended to be construed as to cover the embodiments of this application and all changes and modifications falling within the scope of this application.

Definitely, persons skilled in the art can make various modifications and variations to this application without departing from the spirit and scope of this application. In this way, this application is intended to cover these modifications and variations of this application provided that they fall within the scope of the claims of this application and their equivalent technologies.

The invention claimed is:

1. A positioning operation method, comprising:
receiving, by a network exposure function entity, an identifier of a terminal and first positioning operation information from a third-party device, wherein the first positioning operation information is used to request a first positioning operation on the terminal;
determining, by the network exposure function entity based on the identifier of the terminal, a location management function entity that provides a location service for the terminal;
sending, by the network exposure function entity, a first message to the location management function entity, wherein the first message comprises the first positioning operation information;
receiving, by the location management function entity, the first message from the network exposure function entity;
sending, by the location management function entity, positioning information of the terminal to the network exposure function entity;
receiving, by the network exposure function entity, the positioning information of the terminal from the location management function entity; and
sending, by the network exposure function entity, the positioning information of the terminal to the third-party device.

2. The method according to claim 1, wherein the determining, by the network exposure function entity based on the identifier of the terminal, a location management function entity that provides a location service for the terminal comprises:
 sending, by the network exposure function entity, the identifier of the terminal to a unified data management platform for learning of the location management function entity; and
 receiving, by the network exposure function entity, an address of the location management function entity from the unified data management platform.

3. The method according to claim 1, wherein the first positioning operation information comprises a type of a positioning operation to be performed.

4. The method according to claim 1, wherein the first positioning operation comprises an identifier about the third-party device.

5. The method according to claim 1, wherein the first positioning operation comprises a positioning precision parameter.

6. The method according to claim 1, further comprising:
 sending, by the third-party device, the identifier of the terminal and the first positioning operation information to the network exposure function entity; and
 receiving, by the third-party device, the positioning information of the terminal from the network exposure function entity.

7. A communications system, comprising:
 a network exposure function entity and a location management function entity;
 wherein the network exposure function entity is configured to:
 receive an identifier of a terminal and first positioning operation information from a third-party device, wherein the first positioning operation information is used to request a first positioning operation on the terminal; determine based on the identifier of the terminal, a location management function entity that provides a location service for the terminal; send a first message to the location management function entity, wherein the first message comprises the first positioning operation information; receive the positioning information of the terminal from the location management function entity; and send the positioning information of the terminal to the third-party device;
 wherein the location management function entity is configured to:
 receive the first message from the network exposure function entity; and send the positioning information of the terminal to the network exposure function entity.

8. The system according to claim 7, wherein the determine based on the identifier of the terminal, a location management function entity that provides a location service for the terminal comprises:
 send the identifier of the terminal to a unified data management platform for learning of the location management function entity; and receive an address of the location management function entity from the unified data management platform.

9. The system according to claim 7, wherein the first positioning operation information comprises a type of a positioning operation to be performed.

10. The system according to claim 7, wherein the first positioning operation comprises an identifier about the third-party device.

11. The system according to claim 7, wherein the first positioning operation comprises a positioning precision parameter.

12. The system according to claim 7, further comprises the third-party device;
 the third-party device is configured to send the identifier of the terminal and the first positioning operation information to the network exposure function entity; and receive the positioning information of the terminal from the network exposure function entity.

13. A positioning operation method, comprising:
 receiving, by a network exposure function entity, an identifier of a terminal and first positioning operation information from a third-party device, wherein the first positioning operation information is used to request a first positioning operation on the terminal;
 determining, by the network exposure function entity based on the identifier of the terminal, a location management function entity that provides a location service for the terminal;
 sending, by the network exposure function entity, a first message to the location management function entity, wherein the first message comprises the first positioning operation information;
 receiving, by the network exposure function entity, the positioning information of the terminal from the location management function entity; and
 sending, by the network exposure function entity, the positioning information of the terminal to the third-party device.

14. The method according to claim 13, wherein the determining, by the network exposure function entity based on the identifier of the terminal, a location management function entity that provides a location service for the terminal comprises:
 sending, by the network exposure function entity, the identifier of the terminal to a unified data management platform for learning of the location management function entity; and
 receiving, by the network exposure function entity, an address of the location management function entity from the unified data management platform.

15. The method according to claim 13, wherein the first positioning operation information comprises a type of a positioning operation to be performed.

16. The method according to claim 13, wherein the first positioning operation comprises an identifier about the third-party device.

17. The method according to claim 13, wherein the first positioning operation comprises a positioning precision parameter.

18. An apparatus, comprising:
 at least one processor coupled with a memory, wherein the at least one processor is configured to execute instructions stored in the memory, to enable the apparatus to perform the following operations:
 receiving, an identifier of a terminal and first positioning operation information from a third-party device, wherein the first positioning operation information is used to request a first positioning operation on the terminal;
 determining, based on the identifier of the terminal, a location management function entity that provides a location service for the terminal;
 sending, a first message to the location management function entity, wherein the first message comprises the first positioning operation information;

receiving, the positioning information of the terminal from the location management function entity; and sending, the positioning information of the terminal to the third-party device.

19. The apparatus according to claim 18, wherein the determining, based on the identifier of the terminal, a location management function entity that provides a location service for the terminal comprises:

sending, the identifier of the terminal to a unified data management platform for learning of the location management function entity; and receiving, an address of the location management function entity from the unified data management platform.

20. The apparatus according to claim 18, wherein the first positioning operation information comprises a type of a positioning operation to be performed.

* * * * *